(12) United States Patent
Schlosser

(10) Patent No.: US 9,739,296 B2
(45) Date of Patent: Aug. 22, 2017

(54) CHANNELING FLUIDIC WAVEGUIDE SURFACES AND TUBES

(71) Applicant: Parafluidics LLC, Seattle, WA (US)

(72) Inventor: Thomas George Schlosser, Renton, WA (US)

(73) Assignee: PARAFLUIDICS LLC, Seattle, WA (US)

( * ) Notice: Subject to any disclaimer, the term of this patent is extended or adjusted under 35 U.S.C. 154(b) by 0 days.

(21) Appl. No.: 14/636,150

(22) Filed: Mar. 2, 2015

(65) Prior Publication Data
US 2015/0337878 A1    Nov. 26, 2015

Related U.S. Application Data

(63) Continuation-in-part of application No. 13/938,213, filed on Jul. 9, 2013, now Pat. No. 8,967,326, which
(Continued)

(51) Int. Cl.
*F01N 1/08* (2006.01)
*F15D 1/00* (2006.01)
(Continued)

(52) U.S. Cl.
CPC ............ *F15D 1/003* (2013.01); *F01N 1/026* (2013.01); *F01N 13/082* (2013.01); *F02C 7/045* (2013.01);
(Continued)

(58) Field of Classification Search
CPC ... F01N 1/02; F01N 1/026; F01N 1/08; F01N 1/086; F01N 1/087; F01N 1/089; F41A 21/00; F41A 21/30; F41A 21/325
(Continued)

(56) References Cited

U.S. PATENT DOCUMENTS

| | | | | |
|---|---|---|---|---|
| 916,885 | A | * | 3/1909 | Maxim .................... F41A 21/30 181/223 |
| 951,770 | A | * | 3/1910 | Miller ........................ F01N 1/06 181/253 |

(Continued)

*Primary Examiner* — Edgardo San Martin
(74) *Attorney, Agent, or Firm* — Galvin Patent Law LLC; Brian R. Galvin

(57) ABSTRACT

Waveguide or flow guide surfaces can improve the efficiency of fluid flow through tubes or over surfaces. When incorporated in a tube, the waveguides improve flow and function as sound absorbers making them useful in engine mufflers, firearm silencer/suppressors and jet engine exhaust attenuators. On surfaces, the waveguides can reduce fluid drag and find use on projectiles (e.g., bullets), airfoils for aircraft, and land borne vehicles. The waveguide array in either a tubular chamber or on a surface comprises a plurality of successive wave-like undulations inclined generally in the direction of flow and when employed in tubes extending inwardly to permit an unobstructed path for the fluid gas from entry to exit. The waves define annular wave cavities between their successive inwardly extending edges and the wall of the chamber with each cavity having a cavity mouth open to the unobstructed path. The waveguides are sized and spaced so that gas vortices are created within the cavities when gas flow occurs which vortices create a fluid boundary layer that assists the gas flow.

9 Claims, 32 Drawing Sheets

Related U.S. Application Data is a continuation of application No. 13/540,492, filed on Jul. 2, 2012, now Pat. No. 8,479,878, which is a continuation-in-part of application No. 12/238,253, filed on Sep. 25, 2008, now Pat. No. 8,210,309.

(51) Int. Cl.

| | |
|---|---|
| *G10K 11/00* | (2006.01) |
| *F01N 13/08* | (2010.01) |
| *F01N 1/02* | (2006.01) |
| *F41A 21/30* | (2006.01) |
| *F02C 7/045* | (2006.01) |
| *F42B 10/42* | (2006.01) |
| *F01N 1/00* | (2006.01) |
| *B62D 35/00* | (2006.01) |

(52) U.S. Cl.
CPC .............. *F41A 21/30* (2013.01); *F42B 10/42* (2013.01); *G10K 11/00* (2013.01); *B62D 35/001* (2013.01); *F01N 2470/20* (2013.01); *F01N 2470/24* (2013.01); *F01N 2490/155* (2013.01); *F01N 2490/16* (2013.01); *F05D 2260/96* (2013.01); *Y10T 137/2087* (2015.04); *Y10T 137/2093* (2015.04)

(58) Field of Classification Search
USPC ......................................................... 181/223
See application file for complete search history.

(56) References Cited

U.S. PATENT DOCUMENTS

| | | | | |
|---|---|---|---|---|
| 956,906 | A * | 5/1910 | Sizer ........................ | F01N 1/06 181/253 |
| 981,584 | A * | 1/1911 | Miller ...................... | F01N 1/06 181/253 |
| 1,017,003 | A * | 2/1912 | Kenney ................... | F41A 21/30 181/223 |
| 1,025,251 | A * | 5/1912 | Desmond ................. | F01P 5/08 123/193.3 |
| 1,250,434 | A * | 12/1917 | Connet ..................... | F41A 21/30 138/37 |
| 1,427,802 | A * | 9/1922 | Goodwin ................. | F41A 21/30 181/223 |
| 1,605,864 | A * | 11/1926 | Steinegger .............. | F41A 21/30 181/223 |
| 1,611,475 | A * | 12/1926 | Maxim .................... | F01N 1/003 165/174 |
| 1,835,053 | A * | 12/1931 | Huby ....................... | F01N 1/14 181/262 |
| 1,924,605 | A * | 8/1933 | Haas ....................... | F01N 1/083 181/247 |
| 2,013,956 | A * | 9/1935 | Heath ...................... | F01N 1/089 181/262 |
| 2,101,848 | A * | 12/1937 | Green ...................... | F41A 21/34 181/223 |
| 2,241,729 | A * | 5/1941 | McCurdy ................. | F01N 1/003 181/255 |
| 2,248,456 | A * | 7/1941 | Huntington .............. | F01N 1/02 181/262 |
| 2,286,683 | A * | 6/1942 | McCurdy ................. | F01N 1/00 138/173 |
| 2,375,180 | A * | 5/1945 | Vigo ........................ | F02K 7/12 138/173 |
| 2,450,212 | A * | 9/1948 | Thomas ................... | F01N 3/26 181/262 |
| 2,511,359 | A * | 6/1950 | McLeod .................. | F01N 1/083 181/262 |
| 2,514,996 | A * | 7/1950 | Faust, Jr. ................. | F41A 21/30 181/223 |
| 2,548,563 | A * | 4/1951 | Smith ...................... | F01N 1/14 181/262 |
| 3,492,912 | A * | 2/1970 | Ashbrook ................ | F41A 21/36 181/223 |
| 3,667,570 | A * | 6/1972 | WerBell, III ............ | F41A 21/30 181/223 |
| 3,767,006 | A * | 10/1973 | Perrine ..................... | F01N 1/003 181/225 |
| 3,779,339 | A * | 12/1973 | Johnson ................... | F01N 1/02 181/276 |
| 3,786,895 | A * | 1/1974 | Perrine ..................... | F01N 1/003 181/223 |
| 4,286,689 | A * | 9/1981 | Malmsten ................ | F01N 1/003 181/232 |
| 4,291,610 | A * | 9/1981 | Waiser .................... | F41A 21/30 89/14.4 |
| 5,269,132 | A * | 12/1993 | Loucks ................... | F02K 1/825 239/127.1 |
| 5,679,916 | A * | 10/1997 | Weichert ................. | F41A 21/30 181/223 |
| 5,824,972 | A * | 10/1998 | Butler ..................... | F01N 1/087 181/265 |
| 6,217,764 | B1 * | 4/2001 | Bellhouse .............. | B01D 63/063 210/321.69 |
| 6,308,609 | B1 * | 10/2001 | Davies .................... | F41A 21/30 181/223 |
| 6,347,609 | B1 * | 2/2002 | Bloomer ............... | F02M 35/1255 123/184.57 |
| 6,733,240 | B2 * | 5/2004 | Gliebe .................... | F01D 5/141 416/228 |
| 7,251,941 | B2 * | 8/2007 | Koshoffer ................ | F02K 1/06 239/265.15 |
| 7,857,597 | B2 * | 12/2010 | Anjuri ..................... | F03D 1/06 416/228 |
| 8,061,986 | B2 * | 11/2011 | Xiong .................... | F03D 1/0633 244/204.1 |
| 8,087,250 | B2 * | 1/2012 | Gutmark .................. | F02K 1/48 181/213 |
| 8,133,277 | B2 * | 3/2012 | Scholz ..................... | A61F 2/06 623/1.1 |
| 8,210,309 | B1 * | 7/2012 | Schlosser ................ | F01N 1/026 181/212 |
| 8,479,878 | B2 * | 7/2013 | Schlosser ................ | F01N 1/026 181/223 |
| 8,967,326 | B2 * | 3/2015 | Schlosser ................ | F01N 1/026 181/223 |
| 9,022,740 | B2 * | 5/2015 | Hayashi .............. | F03D 11/0033 416/146 R |
| 9,194,640 | B2 * | 11/2015 | Wirth ..................... | F41A 21/30 |

* cited by examiner

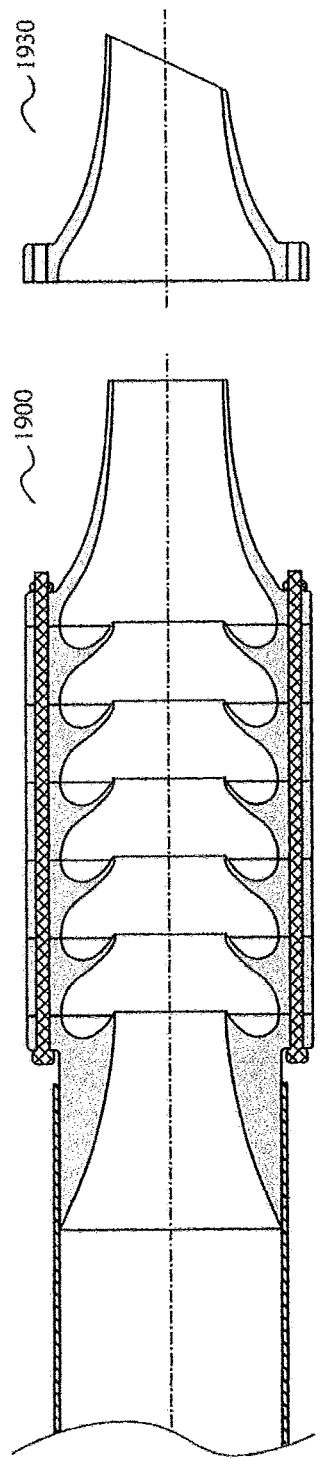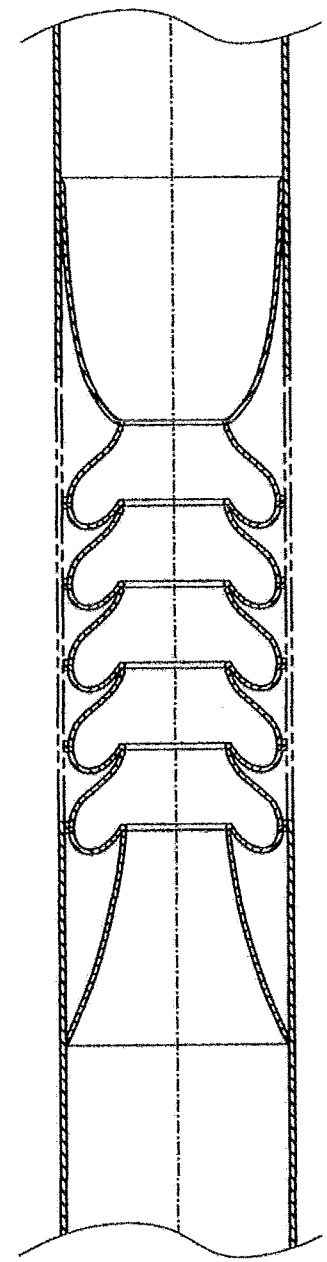
Fig. 6c
Fig. 6d
Fig. 6e

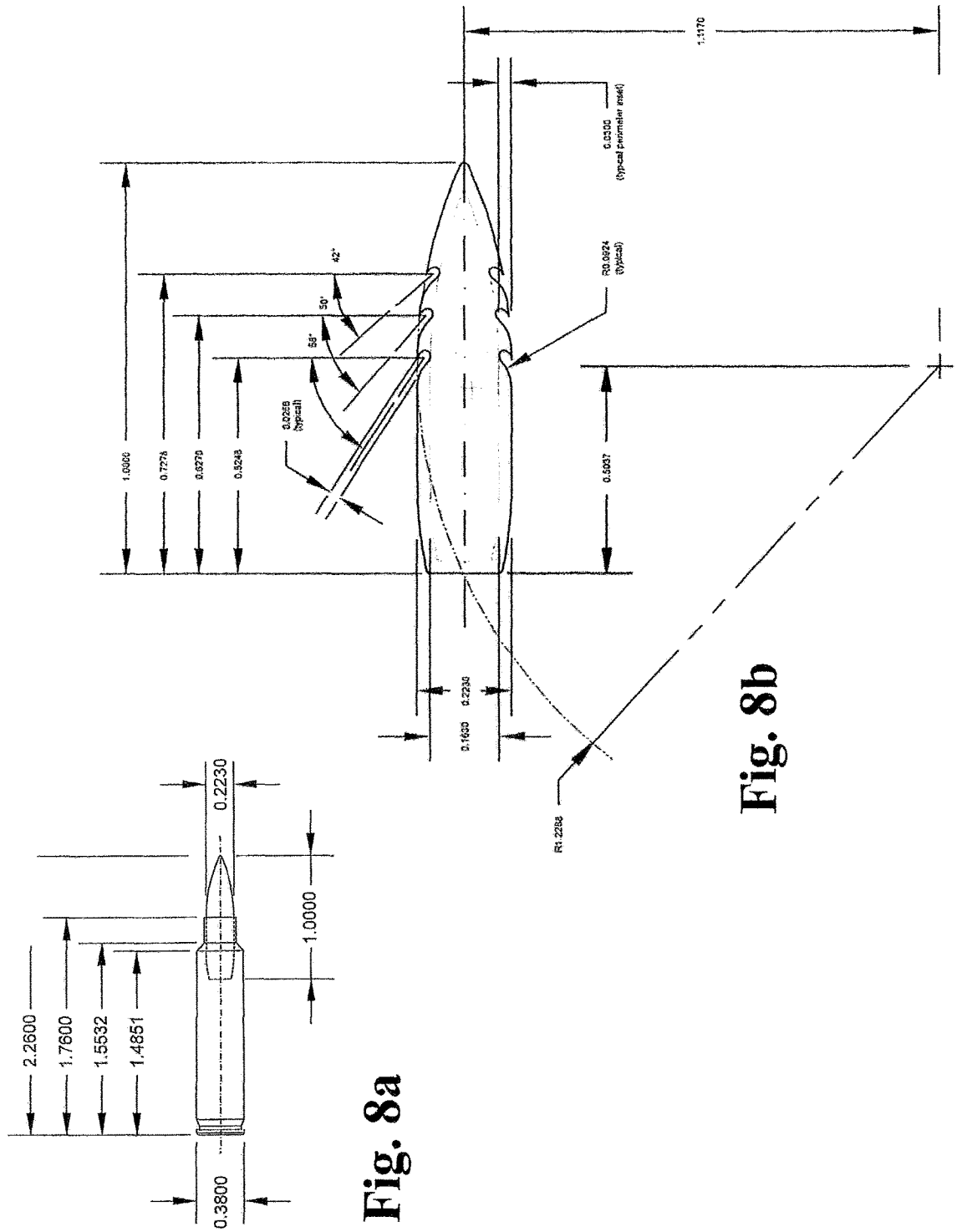

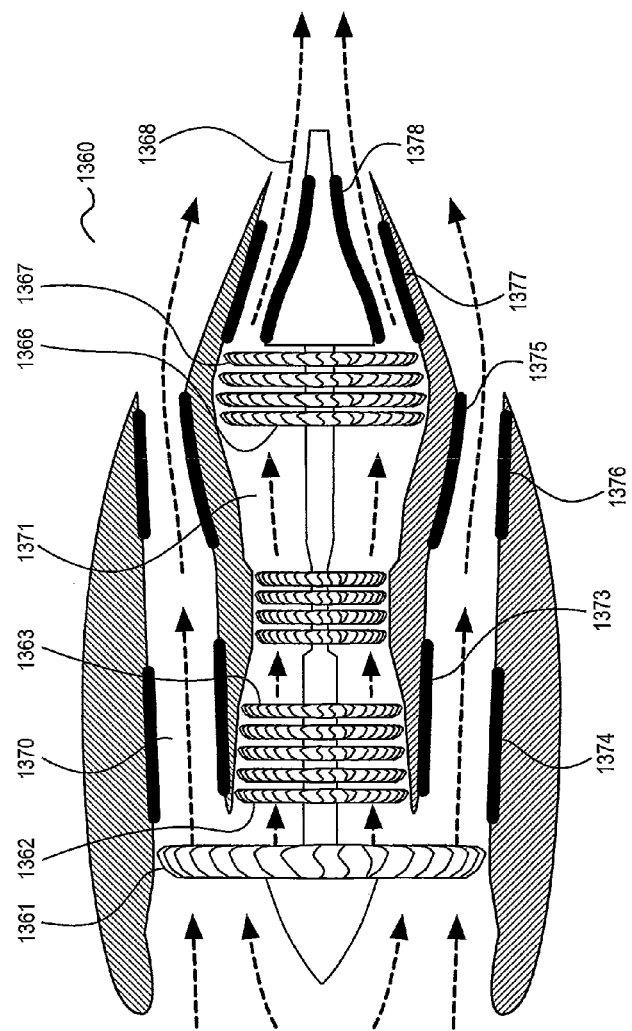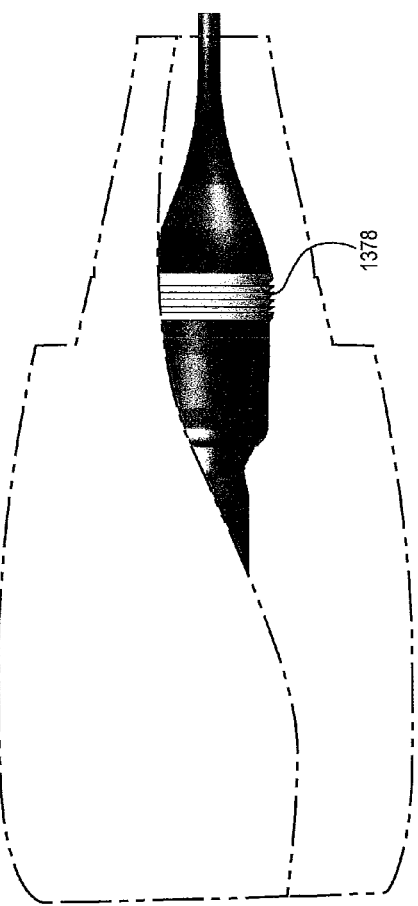
Fig. 13a
Fig. 13b

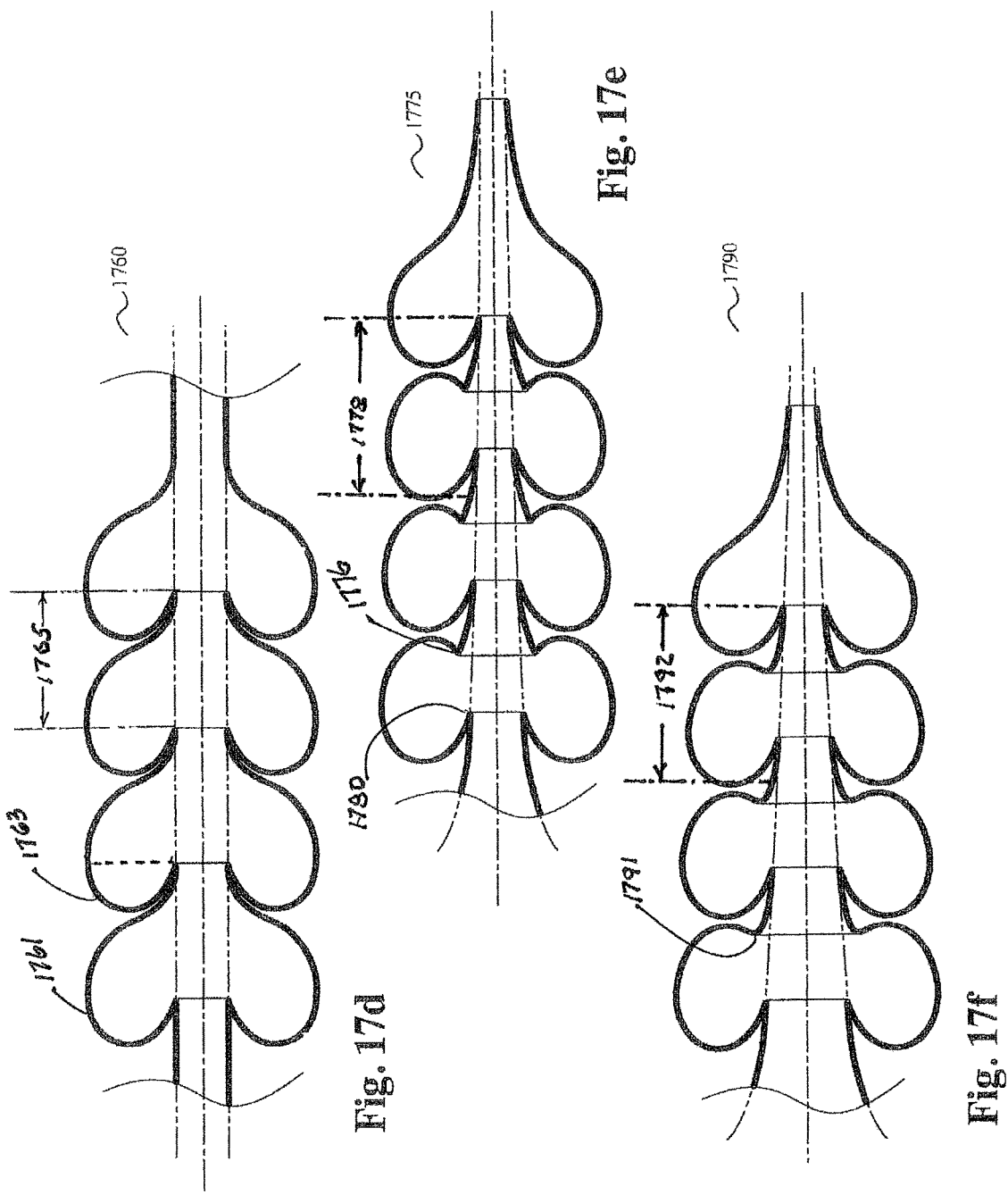

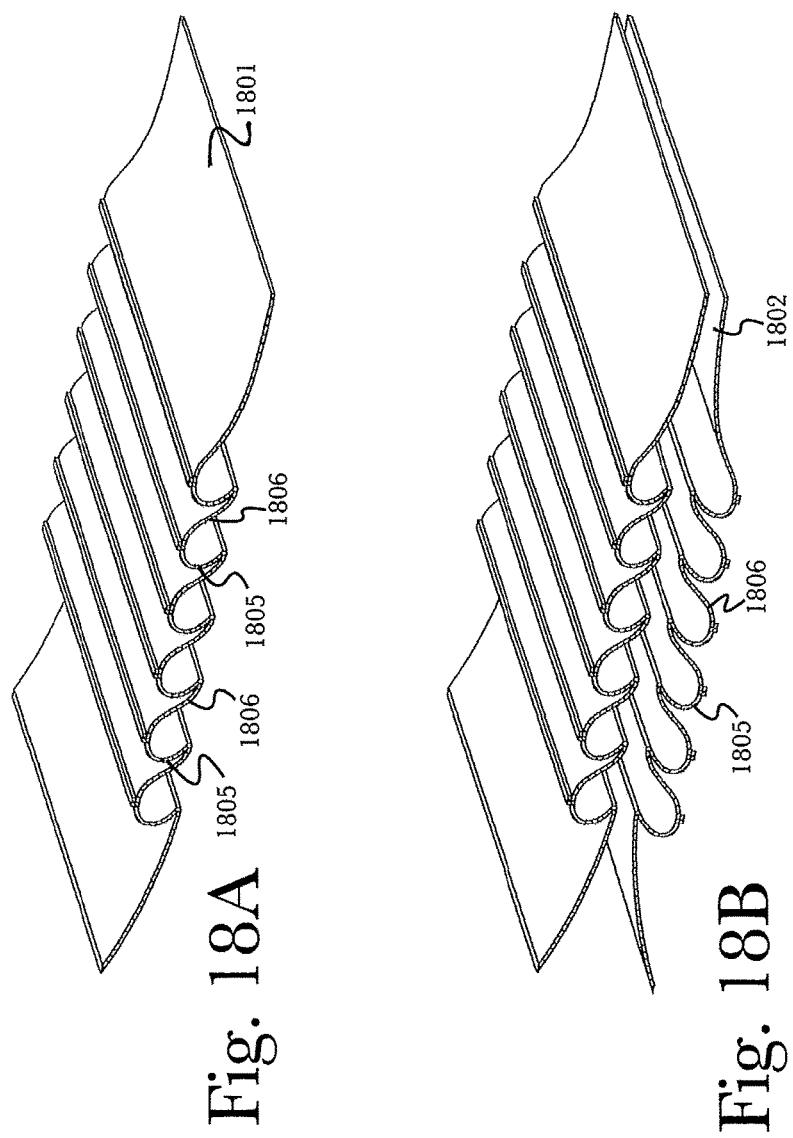

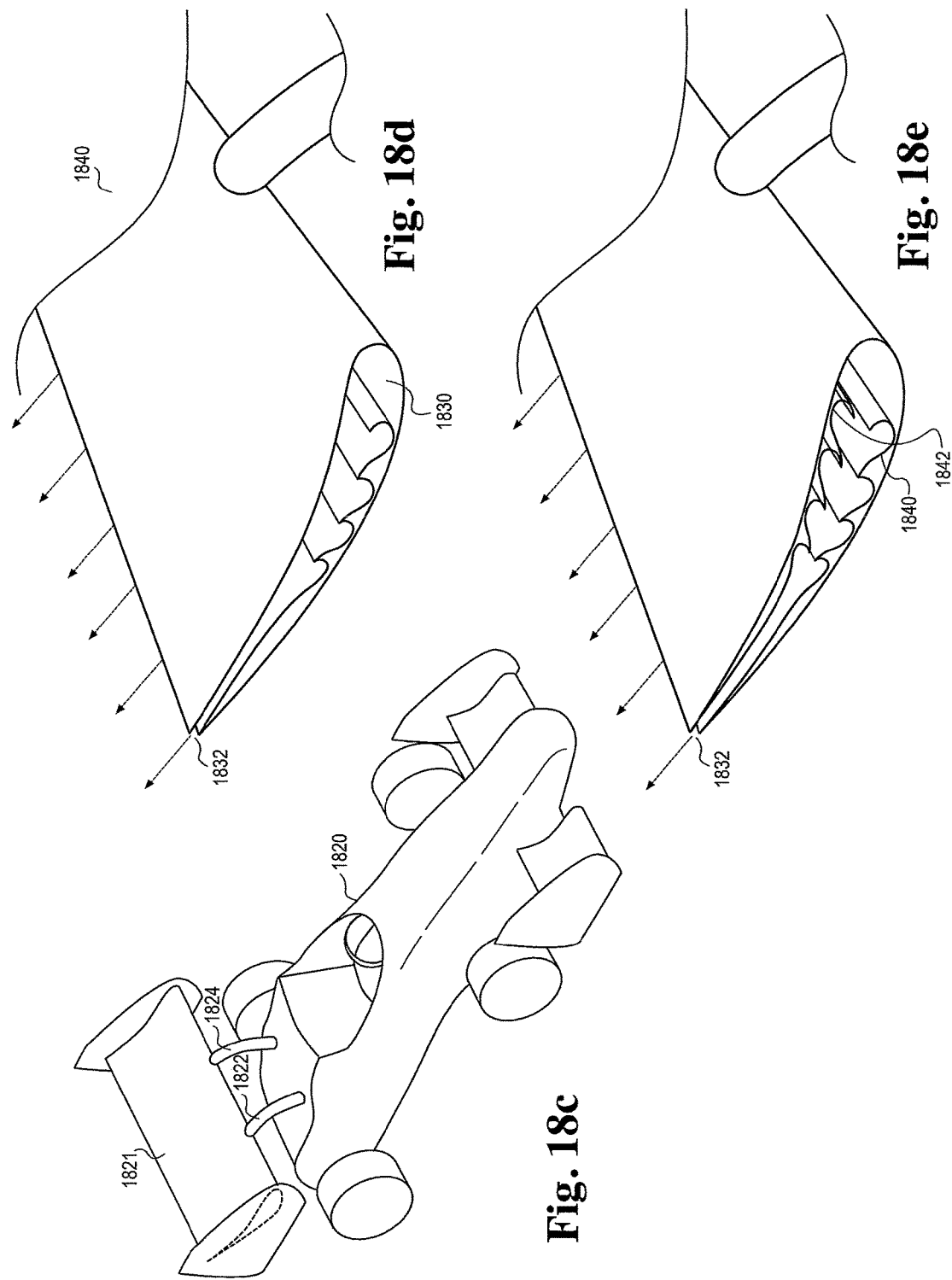

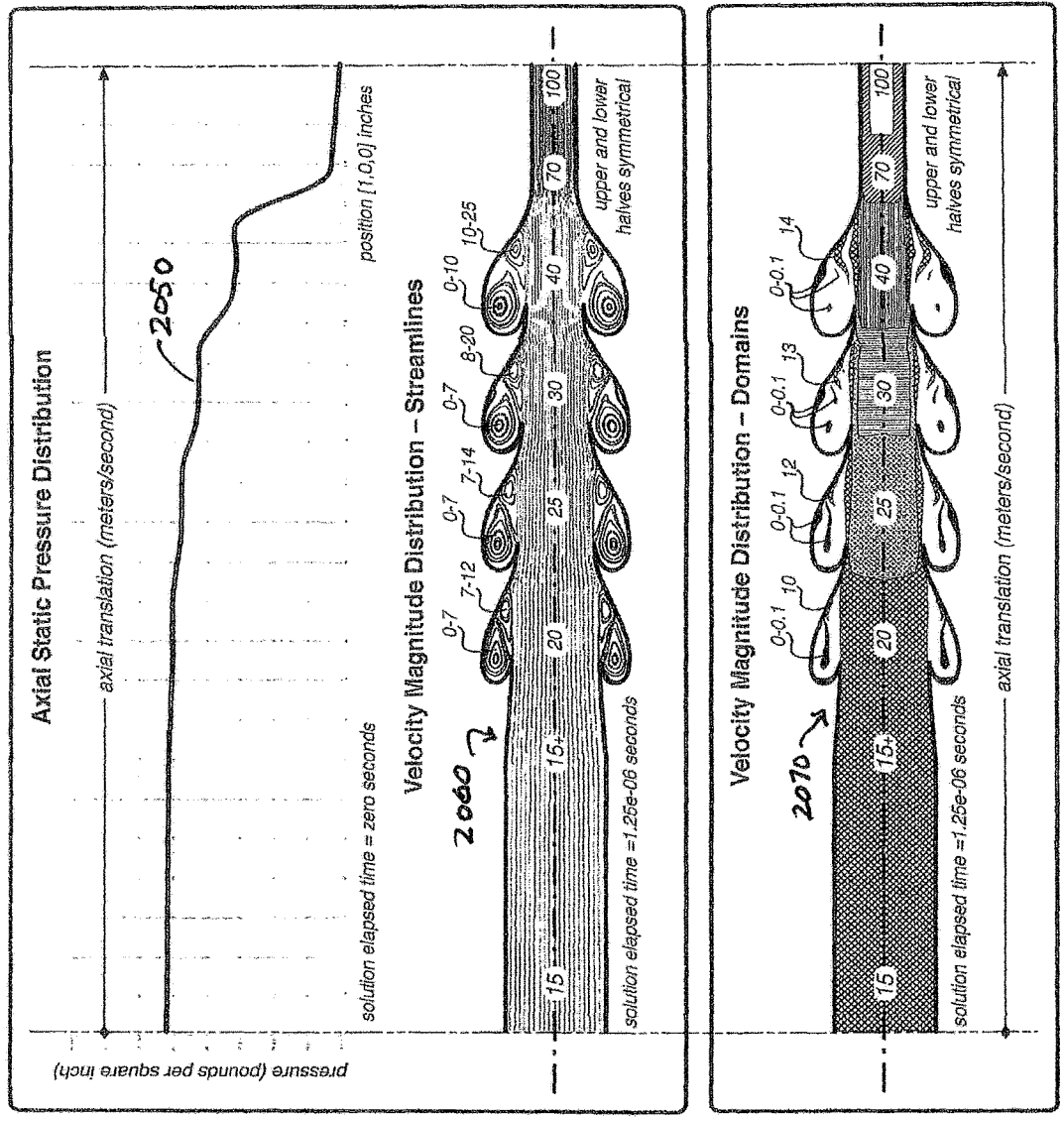

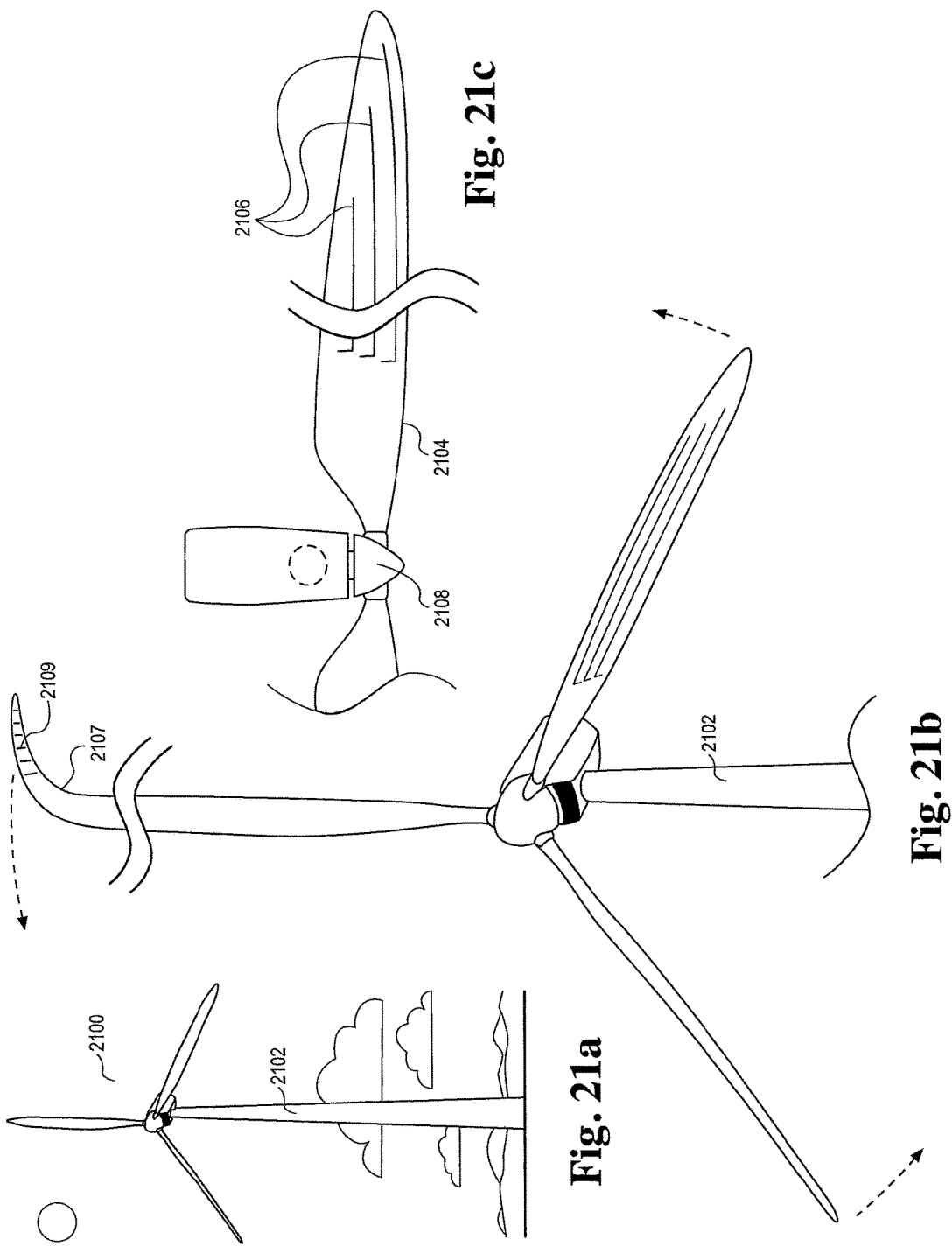

CHANNELING FLUIDIC WAVEGUIDE SURFACES AND TUBES

RELATED APPLICATIONS

This application is a continuation-in-part of U.S. patent application Ser. No. 13/938,213 titled "CHANNELING GAS FLOW TUBE" filed Jul. 9, 2013, which is a continuation of U.S. application Ser. No. 13/540,492, titled "CHANNELING GAS FLOW TUBE, filed on Jul. 2, 2012, now issued as U.S. Pat. No. 8,479,878 on Nov. 1, 2012, also titled "CHANNELING GAS FLOW TUBE", which is a continuation-in-part of U.S. patent application Ser. No. 12/238,253, titled "CHANNELING GAS FLOW TUBE", filed on Sep. 25, 2008, now issued as U.S. Pat. No. 8,210,309 on Jul. 3, 2012, the entire specifications of each of which are incorporated herein by reference.

BACKGROUND OF THE INVENTION

1. Field of the Invention

This invention pertains to tubes having specially configured internal walls, through which a fluid may move with improved efficiency, and more particularly, to such tubes that channel gases, and articles suspended in a gas flow, centrally or axially down the tube. In a particular aspect, this invention provides sound absorbing tubes that both improve gas flow and function to reduce the noise emanating from engines, firearms and the like. This invention also concerns surfaces that incorporate aspects of the specially configured internal walls of those tubes that improve the flow characteristics over the surfaces to produce beneficial results.

2. Discussion of the State of the Art

Backpressure in engine exhausts is a well-known phenomenon that robs energy from the engine. Mufflers and catalytic converters contribute to the backpressure because current designs typically require engine exhaust gases to pass through geometry changes caused by baffles. It is a primary object of the present invention to provide a tube functional as an engine exhaust conduit and as a sound absorbing muffler that reduces backpressure and reduces and ameliorates exhaust noise.

More generally, other tubular devices known in the art rely on fluid flow optimization and require noise moderation, mufflers being one example. Other examples where fluid flow within a tube requires noise moderation include, but are not limited to, firearms (shock waves in firearm barrels reduce the kinetic energy of projectile fired and cause extreme noise), and jet engine exhaust (suppression of jet engine noise has long been a problem).

Fluid flow over surfaces can also cause drag and inefficiency, for example in projectile flight (drag on projectile reduces range and may destabilize flight), aircraft wings and other airfoils (drag reduces efficiency and turbulence may adversely impact lift generated by an airfoil), terrestrial vehicles (drag reduces efficiency), and drag from fluid flows around jet engine nacelles reduces efficiency). What is needed is a way to reduce deleterious effects of turbulence and shock waves in systems relying on fluid flows, to improve the efficiency or effectiveness of those systems.

Seemingly, a principle in the operation of prior art devices such as mufflers and firearm silencer/suppressors that sought to minimize or eliminate is noise was the notion that noise and turbulence in a fluid stream represent disadvantageous and spurious factors that must be cancelled or otherwise eliminated. Consequently, engine mufflers which sought largely to minimize the noise of internal combustion engine exhaust were typically designed with various types of baffles that hindered flow and noise cancellation chambers or structures that were designed to effect dissipation strategies. Firearm silencer/suppressors likewise sought to accomplish the noise reduction task directly by deflecting the explosive stream into dead end chambers or by turning the noise energy back on itself to produce cancellation effects.

Such thinking has produced a body of muffler prior art where the flow of exhaust gases is seldom if ever left unobstructed and is required to navigate a tortuous geometric path as the gas proceeds from inlet or entry port to exhaust or outlet port. Such noise cancellation strategy also persists in prior art technologies that seek to address the noise suppression that is sought to be achieved in firearm silencer/suppressors. Whereas, by definition, a firearm silencer/suppressor must generally leave an unobstructed path through which the bullet can pass within the silencer-suppressor after it leaves the gun barrel (some have bullet-penetrable "wipes" of rubber, plastic or foam), the emphasis in the prior art has stressed providing dead end "expansion" chambers and baffles that seek to turn the noise and other unwanted energy as well as some of the flow back on itself to cancel the explosive report. For example, a search on Google for silencer/suppressors yielded, among other things, images of literally hundreds of firearm silencer/suppressors including sectional views. The great majority of structures seem to involve baffles that are either perpendicular to or are inclined toward the bullet's path coupled with ports to dead end expansion chambers in contrast to the designs disclosed in this application The intent of the instant inventor has been to organize or "manage" the noise, turbulence, and gas flow in both mufflers and firearm silencer/suppressors as well as in other tubular applications as disclosed herein. A flow tube can provide superior noise suppression and improve performance of the underlying function of assisting flow by employing a "waveguide" or "flow guide" construction according to this invention. Specifically, engine mufflers of this invention not only reduce engine exhaust noise, but also reduce the back pressure that prior art mufflers typically impose on the engine to which they are attached. Firearm silencer/suppressors disclosed herein not only successfully moderate the report of a firearm, but also can incrementally increase range and accuracy. Aircraft engine noise suppressors can improve thrust marginally. And surfaces incorporating the principles of this invention can reduce fluid drag, thereby improving efficiency. Hence there are created flow tubes that both absorb and suppress noise while assisting with flow and surfaces that assist with the efficiency of flow.

SUMMARY OF THE INVENTION

When fluid flows through tubes, there will intrinsically be a velocity differential between the fluid near the wall of the tube and the fluid in the center even if the flow is turbulent. Thus, it has been observed that vortex formation occurs along the edge of a free axisymmetric tubular jet, for example, one exiting a gas to atmosphere. The vortex formation is caused by Kelvin-Helmholtz instability and the vortices as a result of that instability eventually collapse after the flow is vented to the atmosphere. A theory espoused by the inventor holds that if vortices were permitted to form and flourish while flowing in the confines of the tube, the result would be a beneficial absorption and organization of the energy within the tube.

In the muffler and silencer/suppressor devices that are disclosed in this application (including noise abatement for aircraft), the sources of energy in the gas flows being moderated are not only gas velocity and heat, but noise energy as well. In prior art auto or truck mufflers and in firearm silencer-suppressors, reduction of the noise was addressed frontally by conducting the gases into dead-end chambers to enclose the noise and use of baffles designed to achieve noise cancellation. Such interruptions of flow are believed to have created a back pressure impediment in those devices. In aircraft, it is not feasible to block or interrupt the noisy exhaust stream from a jet engine, so the most frequently suggested noise reduction fix was sound absorbent padding thereby adding weight and scalloping at the trailing edge of the engine nozzle.

In the tubular devices of the present invention, the dual function of assisting flow and absorbing or suppressing noise energy is accomplished a structure that causes the formation of vortices in a gas flowing into an expansion chamber. Vortex creation is encouraged by providing the chamber with successive waveguides or flow guides that form annular waveguide/flow guide cavities in which vortices may form. The result is believed to be that the heat, velocity and noise in the gas stream are provided a place to translate energy into vortices which will spin within the confines of the cavities thereby absorbing the energy without impeding the flow. The result in a muffler is noise reduction without engine back pressure. In a silencer-suppressor, the result is noise reduction while organizing the blast exiting the silencer-suppressor to a more collimated form resembling a long bluish jet emanating from a 30 caliber rifle muzzle that can increase accuracy and even increase range incrementally. Without the silencer/suppressor of this invention, on the barrel the exit blast more resembled a fiery orange cloud. In aircraft applications, there is provided a technology to reduce jet engine noise beyond addition of sound absorbent padding.

Tubes in accordance with the present invention are believed to function superiorly to the prior art. Such tubes are substantially free of baffles or surfaces that are inclined toward the fluid flow within the tube. Preferably even baffles perpendicular to the direction of flow are avoided. Rather this invention provides tubes that embody an expansion chamber containing waveguides or flow guides past which fluid is conducted. The waveguides extend inwardly from the walls of the chamber and are inclined in the direction of fluid flow within the chamber leaving an unobstructed path for the flow of fluid from the inlet to the outlet. The succession of guides so inclined create a series of cavities in which fluid vortices are created because of the velocity of fluid flow, and the spinning vortices in turn induce the formation of a boundary layer that might also be termed a "shear boundary" that is slower than the flow in the middle of the unobstructed flow path.

More specifically, a tube for moving a fluid, and more particularly a gas, between an entry end which preferably is a venturi inlet where the fluid is introduced and an exhaust end where the fluid exits the tube includes a chamber having a series of waveguides. The waveguides extend inwardly from the walls of the chamber and are inclined in the direction of flow with the edges of the waveguides terminating to leave an unobstructed path for fluid flow from the inlet to the outlet. The series of waveguides (also called "flow guides" at times herein) in turn form and define annular guide cavities which are volumes defined by a guide edge extending generally in the direction of flow and forming one portion of a partially enclosed volume of each cavity. The inclination of the waveguides results in a structure where each of the guide cavities (which can be readily envisioned by viewing the attached drawings) extends behind and upstream of the guide edge and has a cavity mouth immediately downstream of the guide edge that opens the cavity volume in the direction of flow. Characteristics of the fluid flow such as the density and viscosity of the fluid (both of which participate in the calculation of Reynolds number) are believed to affect the size and configuration of cavities defined by the waveguides. In one embodiment depending upon the characteristics of the fluid flow, each successive guide in the downstream direction may be smaller than a next prior upstream guide. Such a construction would be anticipated more useful in applications where the gas velocity through the chamber is expected to decrease. In such configurations, the tube thus forms an effective funnel ending at a tube exit end smaller than a tube entry end. The guides are arranged longitudinally with a smaller end extending toward the exit end extending into a larger end of a next adjacent guide. The larger end of the next adjacent guide extends past the smaller end of its prior flow guide and loops back to taper into smooth connection with the outside of the smaller end of that prior flow guide therein creating a cavity in the guide. In effect, the various embodiments of the invention serve to employ vortex turbulence within the guide cavities as a work function to achieve flow and thrust structure modification, by idealizing fluid dynamic interactions into organized geometric structures in a flow continuum. When the flow/waveguide is geometrically configured in a fashion consistent with and sympathetic to the ideal geometry of the fluid dynamic instability being groomed, the flow vector forces also become organized and may be directed in a manner that provides allowing an engineered flow continuum protocol providing a benefit such as energy efficiency or shock wave absorption and translation to a fluid continuum with a higher degree of forward momentum.

Put another way, the invention provides an effect analogous to Faraday's Law, in which changes in a magnetic field induce electric current through a conductor; in the case of embodiments of the invention, fluctuations of a flow continuum are employed to accelerate fluid current through a conduit or across a surface treated according to the invention. In Faraday's Law, greater magnetic flux increases electric current; according to the invention, greater pulse/noise/flux amplitude provides more fluid acceleration and laminar flow (or a higher degree of forward momentum).

The collection of the guide smaller ends defines a continuous curved or straight inner line defining an effective inner wall of the tube that funnels gradually and smoothly from the entry end to the exit end. That curved inner line may be logarithmic or parabolic or another continuous curved or straight line. A continuous outside line that tangentially contacts each of the guides outside of the tube may also be drawn between the guides. The outside line may also be straight, logarithmic, or parabolic or any other curved continuous line, though having a higher rate of curvature than does the inner curved line.

In an alternative embodiment, particularly where the velocity of fluids are relatively high, the waveguides and the cavities that they define can be uniformly sized and spaced thereby greatly improving the efficiency and expense of fabricating the tubes with a series of identical waveguides and guide cavities. In commercial exploitation of this invention, it will often be advisable experimentally to seek a tube design with uniformly sized and spaced waveguides and guide cavities because advantages with respect to flow efficiency will nonetheless accrue, and the expense of creating a multi-sized flow-guided tube will be greatly reduced.

Gas passing rapidly past the guide cavities induces a cyclic domain of fluid movement or a vortex within each waveguide cavity and a resultant vector of axial fluid movement close to the continuous curved or straight inner line, allowing forces resulting from fluid expansion to enter a cavity, whereupon it is allowed to expand, rotate, reflect and mix. That is, momentum-accumulating rotor effects cause a Bernoulli Effect reducing pressure within the cavities. Because the mouth of the guides are large and are relatively unrestricted (by that is meant that fluid does not pass through a restriction to exit the guide cavities), a vortex is induced from a shearing interface between gases within the cavity and the main flow of gas moving down the tube translating kinetic energy from the main flow into the vortex of a respective cavity as well as shedding the over-spilling or shedding portion in a relaying effect to successive downstream cavities.

It has been empirically shown that when the tube is installed as an automotive exhaust pipe, gas exits the tube producing reduced sound and more efficiently producing less back pressure as measured by increased performance, measured both in horsepower and in torque, as indicated in vehicle dynamometer tests. It has also been shown empirically that when the tunnel is employed as a chute for fluid including solids, solid items such as fruit or balls and other particulates depending on their size and the corresponding configuration of the tubular version of the embodiment, may become transported through while suspended or may be drawn into some or many of the cavities and routed into or separated from the primary flow, thus☐ preserving the fruit or other item from damage from the side of the tube. It is therefore concluded that the vortices work to form a buffer layer extending generally along a the curved or straight line defining the guide edges from the tube inner walls, hence providing a mode of object, particulate, viscosity, slurry or other object separation where their respective sizes cause them to be separated or stripped-away from a primary flow (throughput fluid jet). The result then is an outer layer of gas moving past the vortices of the waveguides and the tunnel interior wall that is slower than the inner flow of gas nearer the center of the tube. The inner layer then comprises the observed buffer to the inner flow of gas and objects in the inner flow.

When installed as part of an engine exhaust pipe as mentioned above, the device has been found to be an effective muffler without using conventional baffles and silencers that seek to cancel shockwaves, in a manner consistent with cavity resonance effects. Expansive forces are utilized or expended as a motive force to accelerate a fluid jet axially, so if used their expansive potential lowers the potential amplitude of sound or compression waves, thereby reducing sound without using conventional baffling. It has also been found that a change in the dimensions of the guides changes engine exhaust sound, usually lowering an audible frequency or pitch.

When used as a ballistic arms suppressor or silencer, the acoustic bass response is deeper. The suppressor's flashpoint length beyond the exit point of the projectile from the barrel is also extended, indicating compression waves have expanded. Expanding waves are characteristic of an expansion chamber effect, but waves being stretched along a trajectory (such as sound/light, are characteristic of Doppler Shift).

The inventor suggests that the guides induce a density gradient with heavier particles moving to the center of the gas flow and lighter particles moving outward toward the tube interior surface and the vortices. It is suspected that this organization of particles can reduce or eliminate compression waves that are found in conventional automobile exhaust systems. Specifically, as a fluid jet moves through a tunnel or over a surface-treatment embodiment of the invention, cavitation effects caused by and within the guides reorganize fluid-dynamic forces in such a way that force vectors become aligned with the fluid jet's preferred direction of flow, thereby optimizing fluid movement and reducing heat and noise generation. Shockwaves of an initial flow continuum are employed as a motive force causing cavitation effects to become beneficial in accomplishing that optimization. It is also suspected that the funneling effect of the outer gas flow along the tube inner wall contributes to a partial destruction of compression waves in the exhaust. The outer gas layer also acts as a smooth boundary to the inner flow which promotes evenness to the inner flow.

In a preferred embodiment of the invention, a tube for moving a fluid, more preferably a gas, between an entry end into which gas is introduced and an exhaust end through which gas exits the tube, the tube comprising a closed chamber that has an overall volume that permits expansion of the entry gas, and where the chamber presents to the gas flow a plurality of adjoining adjacent and successive flow guides extending inwardly from the walls of the chamber but terminating to permit a typically central unobstructed path for gas flow from entry to exhaust. Preferably the inlet has the configuration of a venturi. The waveguides within the chamber are inclined generally in the direction of flow thereby defining annular guide cavities between successive inwardly extending waveguide edges and the chamber wall with a cavity mouth open to the unobstructed path; each guide therefore comprises an annular guide cavity volume defined in part by successive guide edges extending generally in the direction of flow and forming a partially enclosed volume upstream of the upstream guide edge and a cavity mouth downstream of the guide edge that opens generally without restriction into a region central in the tube where there is unidirectional flow past the guide edges that is relatively unobstructed. The cavity upstream of the guide edge defines a volume that induces the creation of gas vortices when flow occurs, which vortices create a gas boundary layer that moves past the guide edges and cavity mouths more slowly in the direction of flow than the unobstructed flow that is more remote from the cavity mouths. A cavity configuration that approximates half of a smoothly-curved, modified torus, and an outer rigid tube wall, encourages the creation of a fluid vortex within the cavity when the flow is established. The approximately toroidal configuration, though preferred, is not essential.

It has been observed that gas entering the chamber can induce fluid vortices in the cavity volumes behind (i.e., upstream of) the guide edges and that the more efficient and energy-concentrating the cavities are by virtue of their configuration, the greater is the back pressure relief on the engine and the greater is the noise suppression of the exhaust stream. A curved and generally half-toroidal configuration (or generally half-elliptical configuration) at the upstream confines encourages vortex formation within the cavity is preferred. However, it will be understood that fluids will tend to form vortices in any compliant volume, so those in the art will understand the preference for some curvature the upstream end of the waveguide cavities. But even when a curved configuration is absent, beneficial results are obtained. In angular guide cavities, the vortices are formed, and although believed more likely to be fragmented, beneficial results are nonetheless realized.

According to the implementation of the embodiments, each guide forms an internal cavity with a cavity mouth opening into an inner portion of the tube, the cavities shaped such that a vortex forms within each of the cavities as gas passes through the tube, and the flow of fluid in the tube is unidirectional and axial from the entry end to the exit end.

According to another embodiment, the tube further comprises a plenum between the outer rigid tube or chamber wall and a plurality of outer surfaces of the plurality of adjoining adjacent guides, the plenum further comprising a plurality of air inlets proximate to the inlet end of the tube, and an outlet nozzle at the exit end of the tube which is adapted to receive exhaust gas as it exits the tube. The passage of high-speed exhaust gases through the outlet nozzle causes a pressure drop that pulls in ambient air from the plenum, the flow of air from the air inlets through the plenum to the outlet nozzle acting to cool the external surface of the tube.

According to another embodiment, the tube acts as a muffler for an internal combustion engine. According to yet another embodiment, the tube when appropriately configured acts as a suppressor or silencer for a firearm.

A still further embodiment involves placement of channeling waveguide surfaces in aircraft jet engines and jet turbofan engines to reduce the loudness of the engine exhausts. In such engines placement of the waveguide surfaces may be in the interior of the exhaust nozzle as well as on both inner and outer surfaces of the annular bypass channels of a turbo fan engine.

Aside from the applications of this invention to obtain advantages in fluid flow though flow enclosures or tubes, this invention enables the modification of surfaces to reduce fluid friction or drag over the surfaces by incorporating surface waveguides similar in shape and function to those described above in tubes. Such modification to a surface over which fluids, particularly gases, may be expected to flow substantially unidirectionally can reduce the frictional resistance of the fluid or gas over the surface. Accordingly, advantageous results can be achieved by placement of waveguides having the configuration of the flow guides discussed above on the external surfaces of projectiles (such as bullets or artillery shells), on airfoils and nacelles, e.g., those present on aircraft, or windmill blades, and on the surfaces of land-borne vehicles (to reduce wind resistance).

Moreover, the employment of a "waveguide cavity skin" on the hulls of waterborne vehicles will reduce water resistance and improve performance. It has already been disclosed that variously defined "shark skin" surfaces may improve water flow over such surfaces. However, in this application, the inventor is proposing a surface that can be industrially formed for placement on boat hulls to improve performance.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 6:
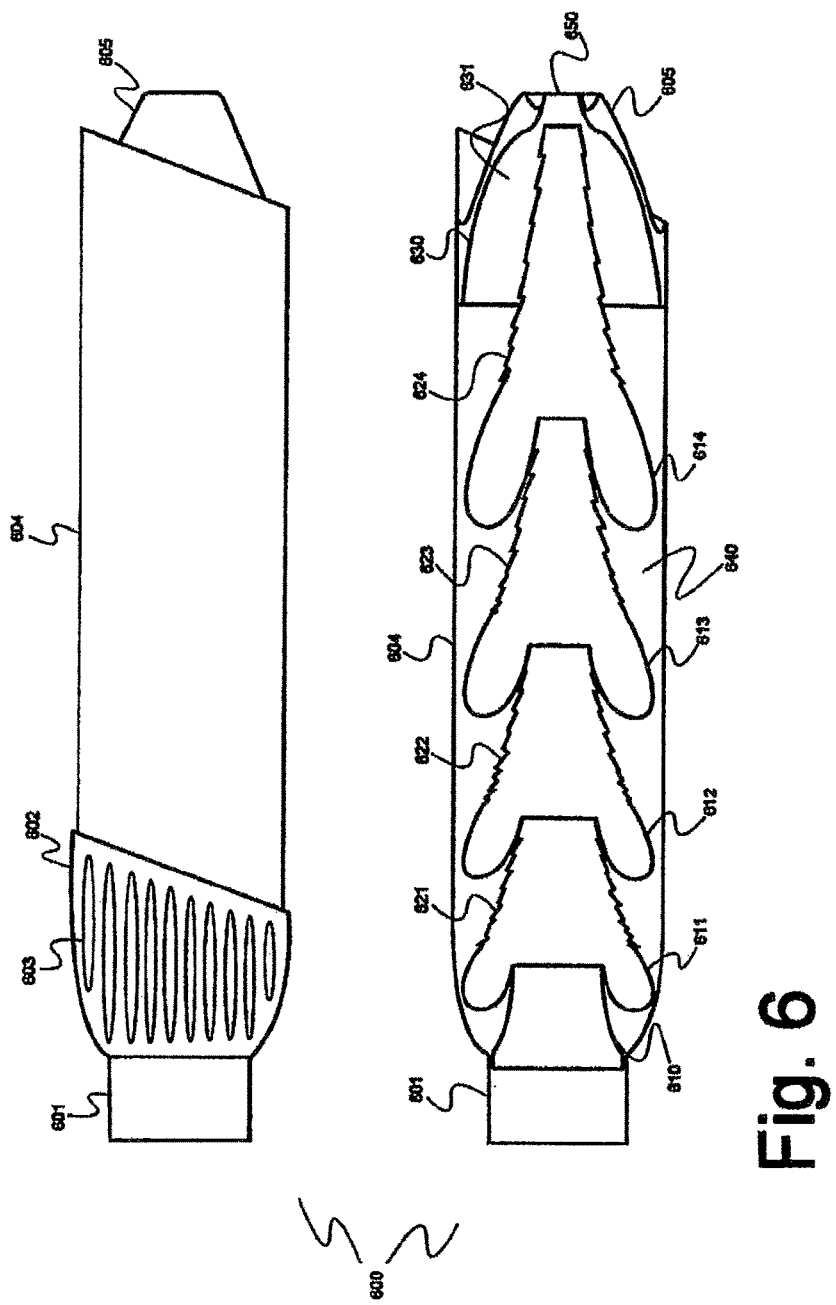
FIG. 6 is a diagram of a novel muffler design, according to a preferred embodiment of the invention.
Figure 6A:
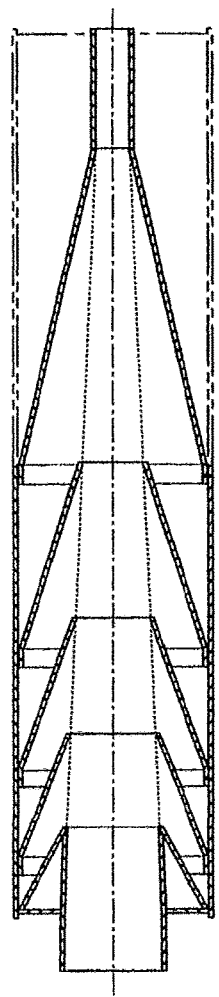
Figure 6B:
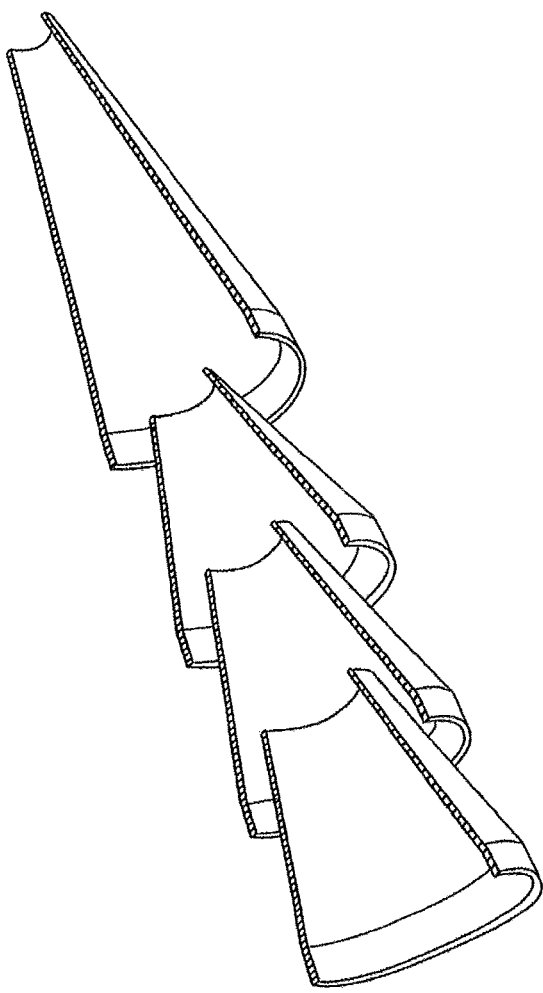

FIGS. 6a and 6b respectively show a lateral cross section of a muffler with straight waveguides and an exploded perspective view of the waveguides in half section.

FIG. 6c shows a lateral sectional view of an alternative muffler design assembled from machined aluminum disc-like components having a venturi inlet, a number of identical waveguide discs and a venturi outlet.

FIG. 6d shows an alternative venturi outlet and an alternative construction with a larger outlet cross-port.

FIG. 6e illustrates how a muffler having the configuration of FIG. 6c may be constructed of formed sheet materials as opposed to machined metal.

Figure 7:
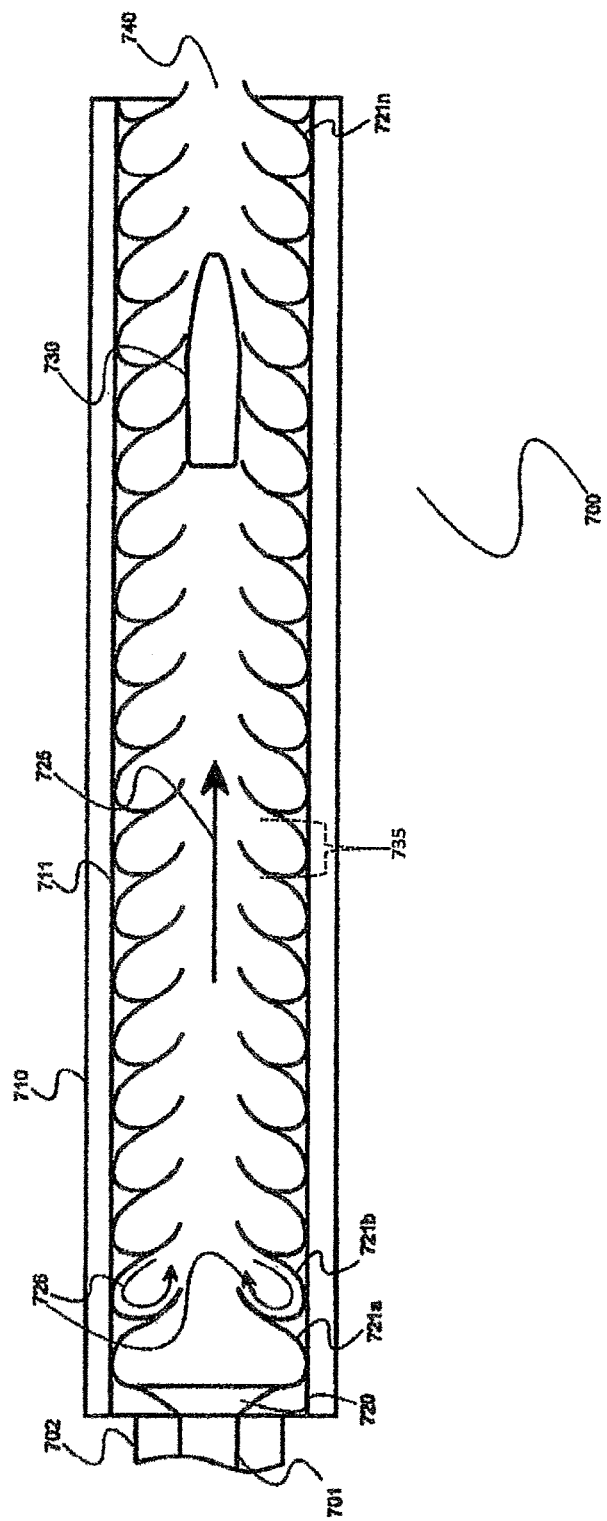

FIG. 7 is a diagram of a novel firearm suppressor/silencer design, according to an embodiment of the invention.

Figure 8:
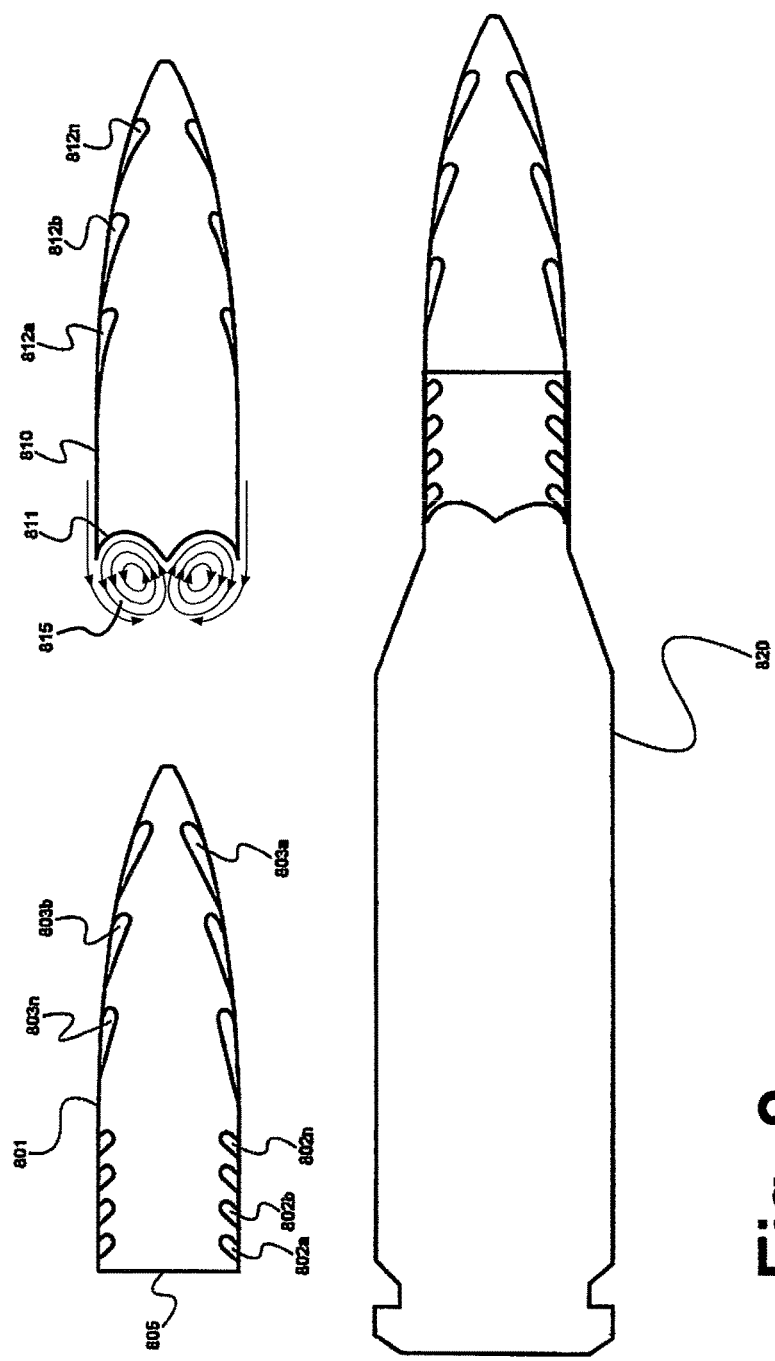

FIG. 8 is a diagram of a novel firearm ammunition design, according to an embodiment of the invention.

FIGS. 8a and 8b provide a detailed dimensional description of commercially available ammunition that can be modified in accord with the invention.

Figure 9:
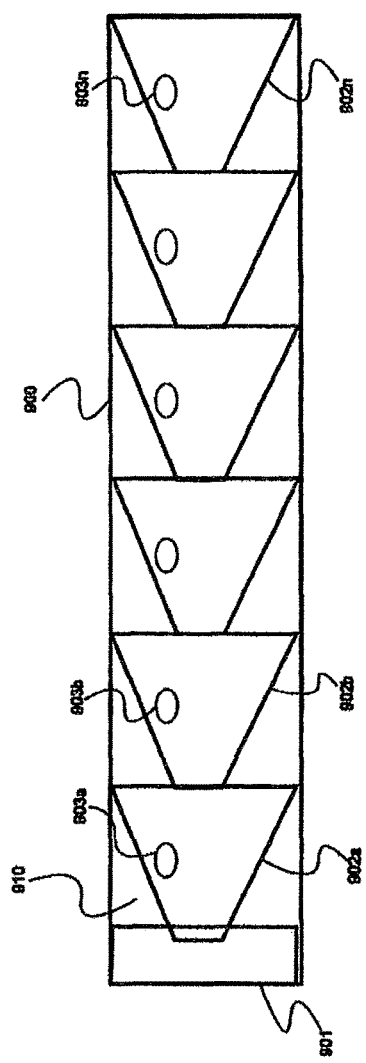

FIG. 9 (PRIOR ART) is a diagram of a K-type firearm silencer known in the art.

Figure 9A:
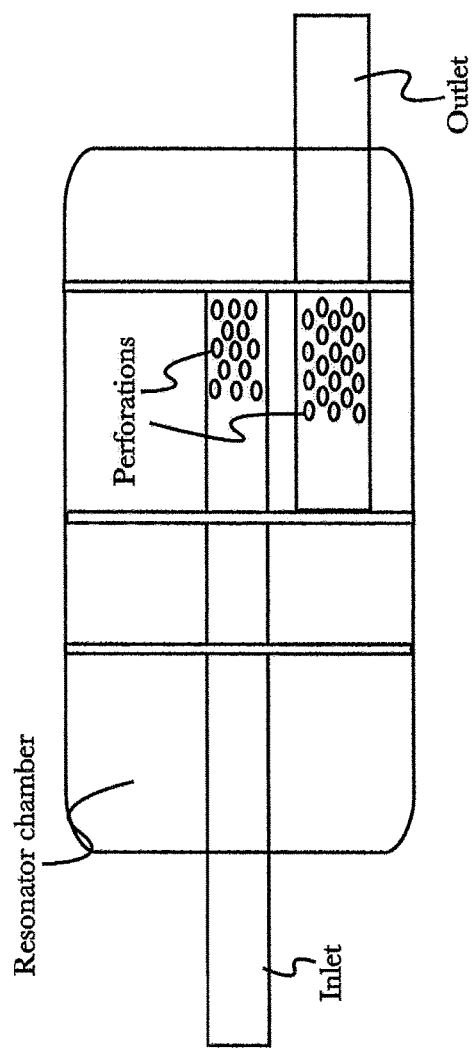

FIG. 9a (PRIOR ART) illustrates a typical configuration of automobile mufflers in the prior art.

Figure 10:
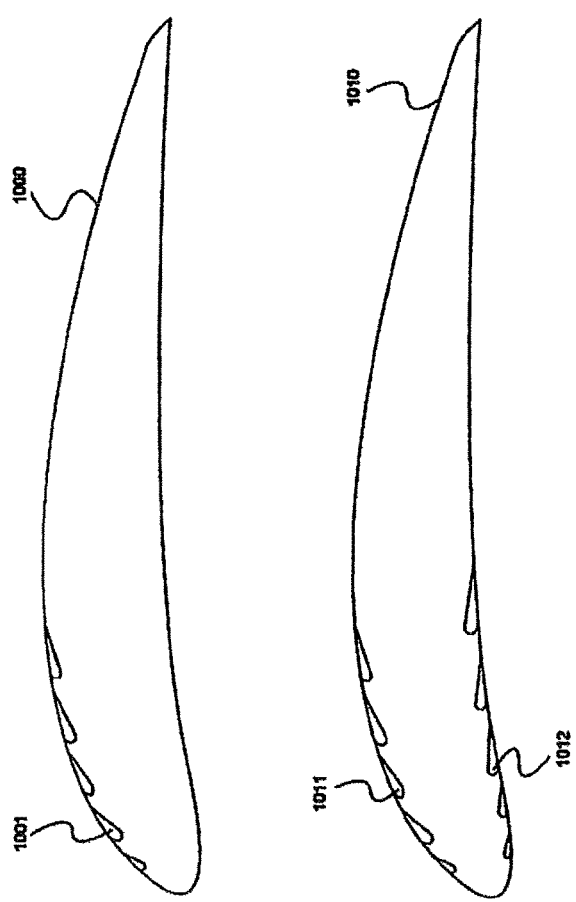

FIG. 10 is a cross-sectional view of an airplane wing or airfoil modified in accordance with an embodiment of the invention.

Figure 11:
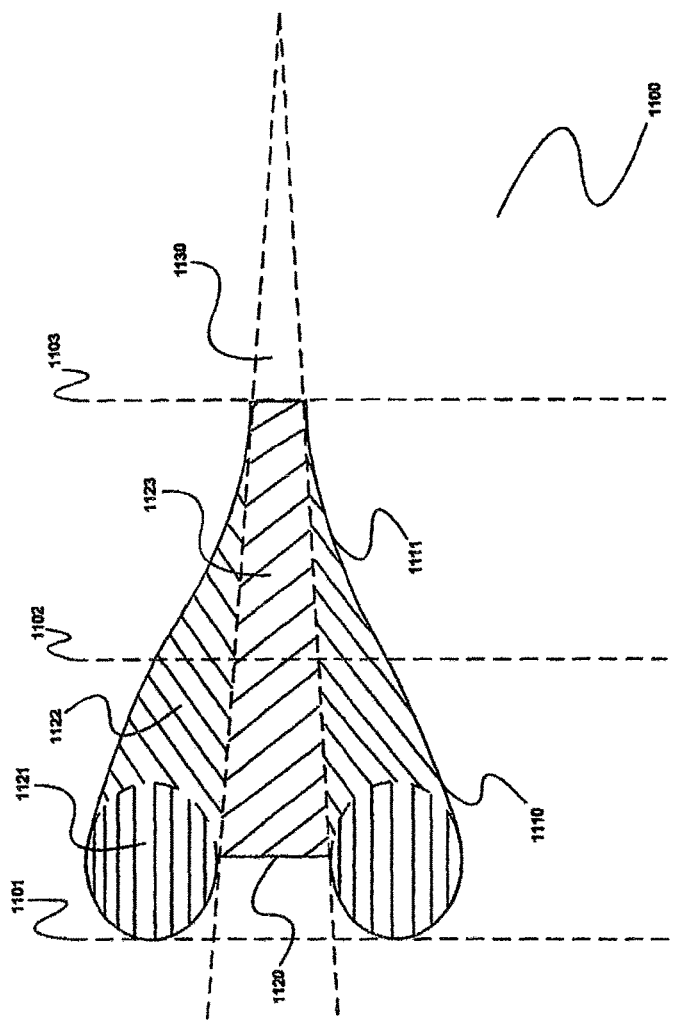

FIG. 11 is a diagram illustrating various aspects of a mechanism for converting turbulent flow into orderly flow, according to an embodiment of the invention.

Figure 12:
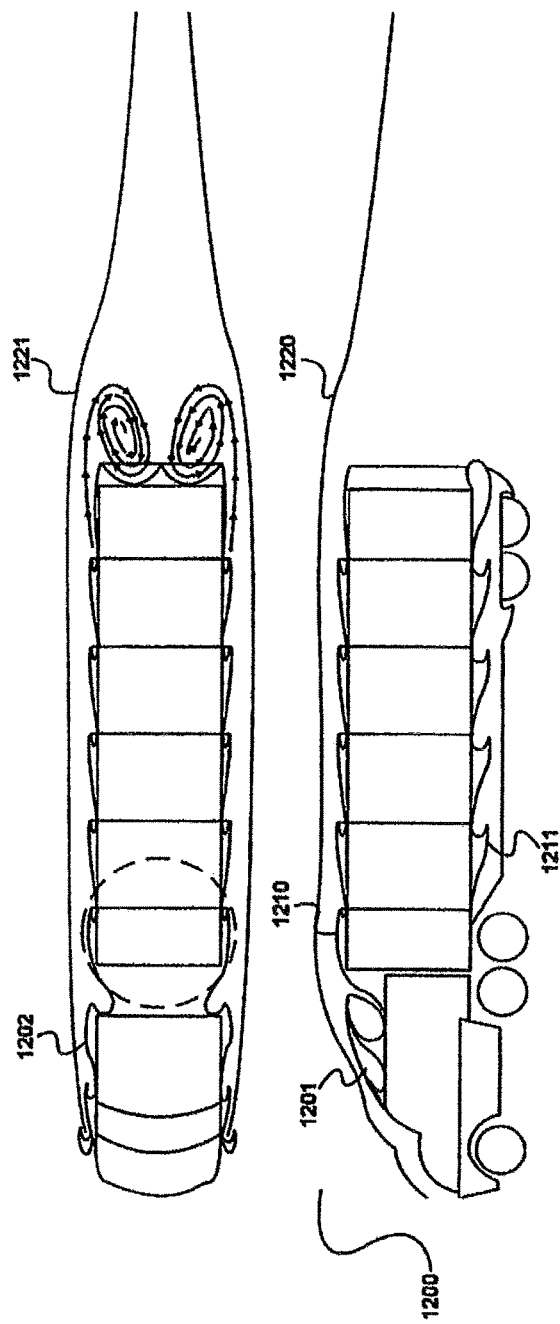

FIG. 12 is a diagram showing exemplary modifications to a truck to reduce drag and improve fuel efficiency thereof, according to an embodiment of the invention.

Figure 13:
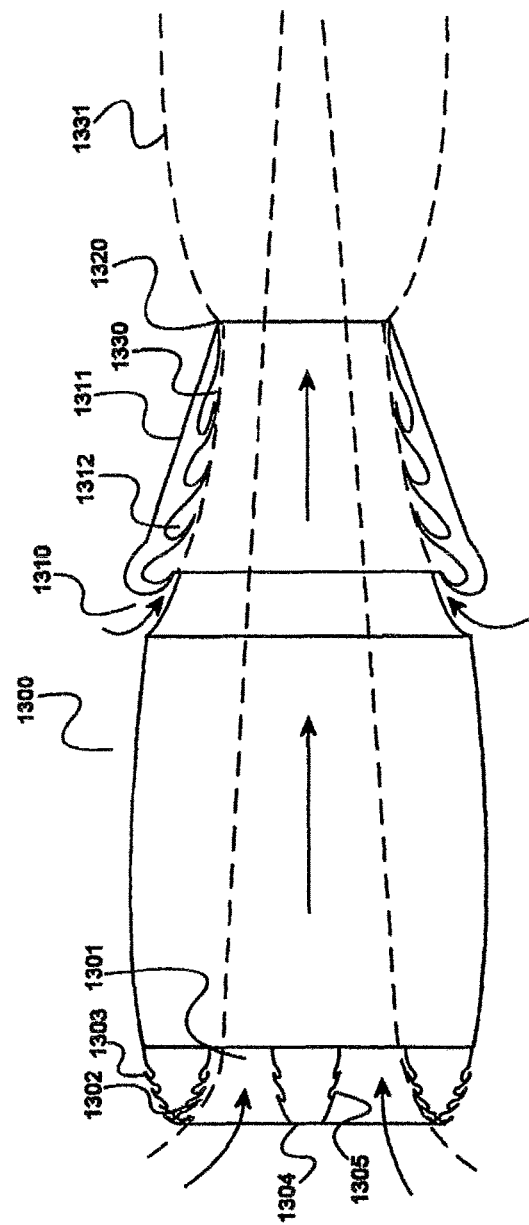

FIG. 13 is a diagram showing an exemplary modification of a jet engine to reduce turbulence and drag and improve fuel efficiency thereof, according to an embodiment of the invention.

FIG. 13a is a sectional drawing of a CFM56 type of turbofan jet engine to illustrate where waveguide surfaces may be advantageously placed to reduce sound and collimate flow.

FIG. 13b is a partial perspective view of the exhaust cone of the CFM56 type engine of FIG. 13a on which waveguides may be advantageously placed.

Figure 14:
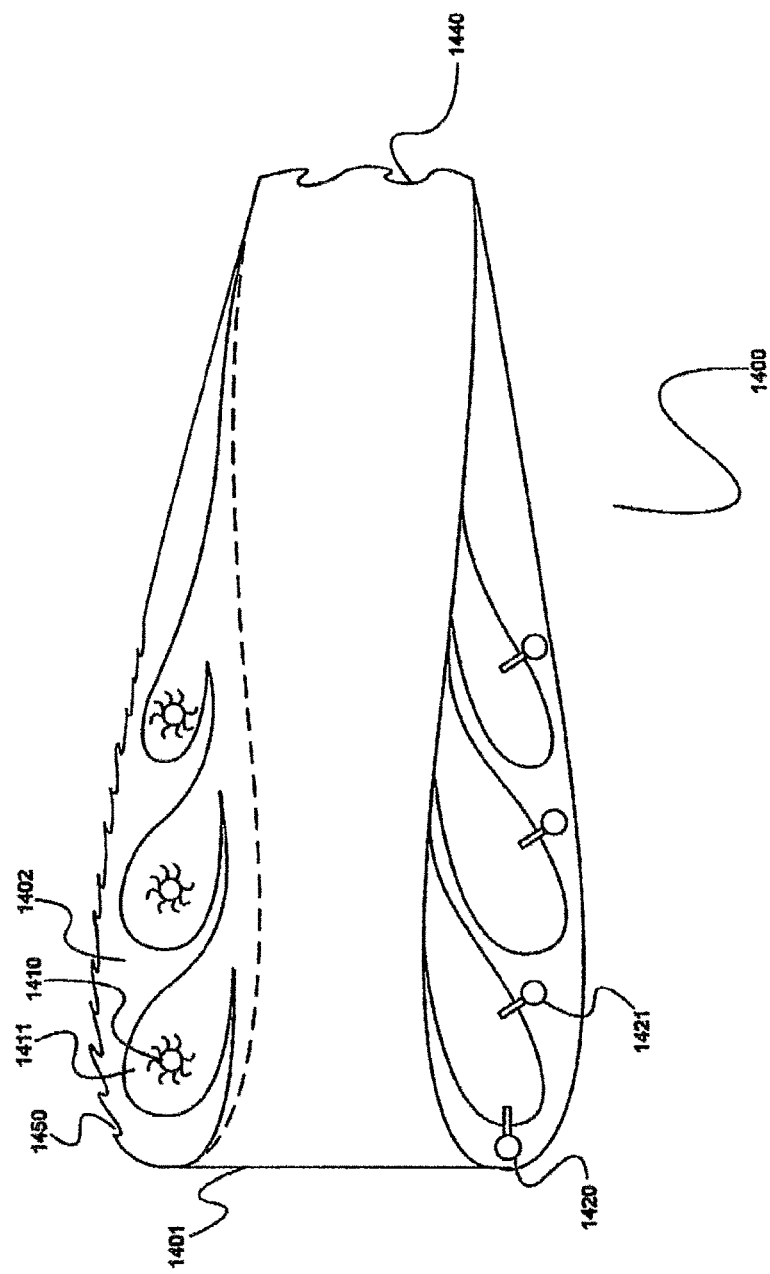

FIG. 14 is a diagram of a novel jet engine design according to an embodiment of the invention.

Figure 15:
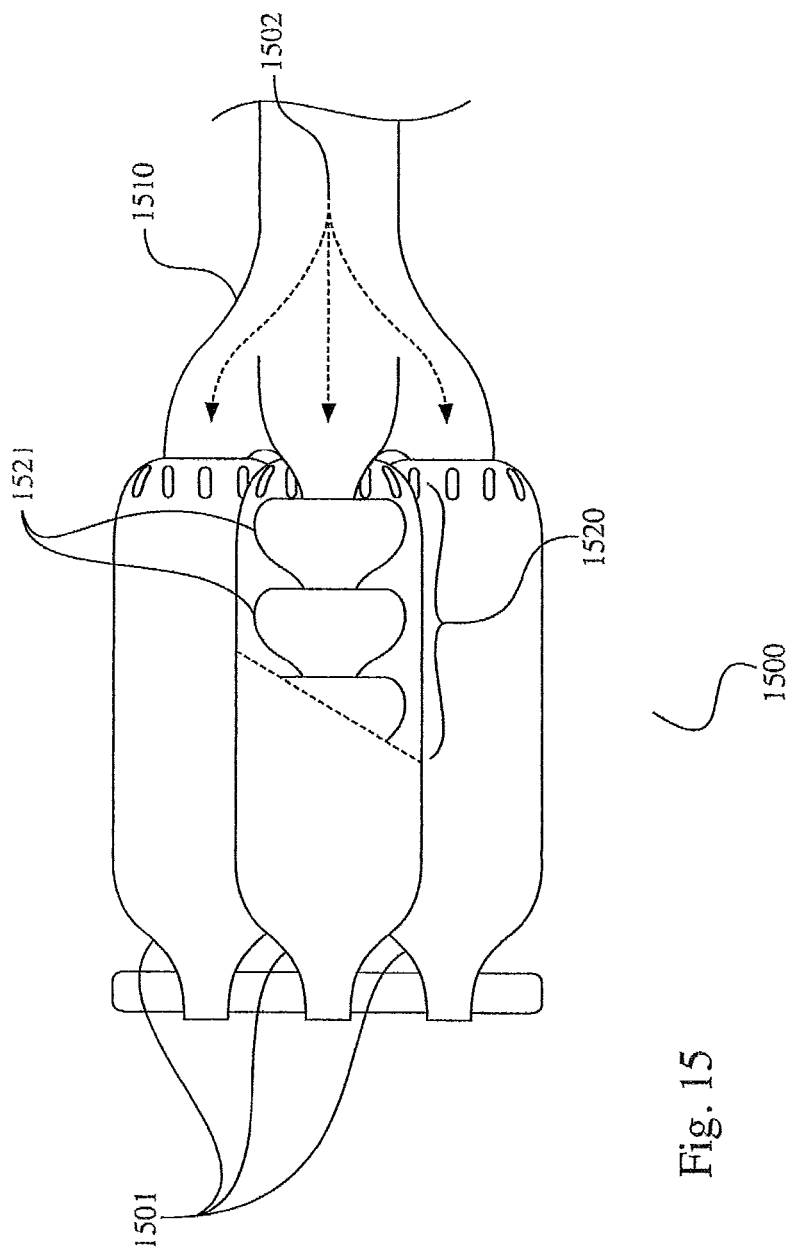

FIG. 15 is a diagram of an arrangement of channeling gas flow tubes according to an embodiment of the invention.

Figure 15A:
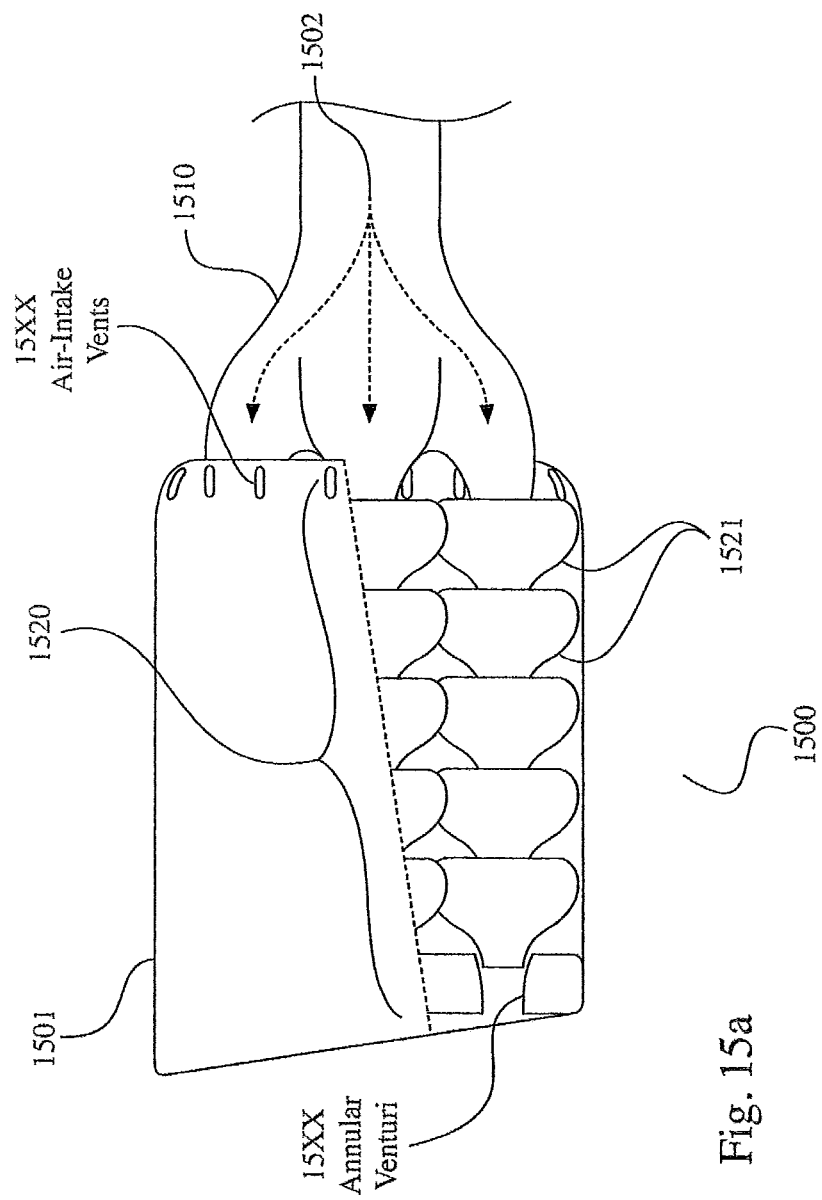

FIG. 15a is a diagram of an arrangement of channeling gas flow tubes according to an embodiment of the invention.

Figure 16:
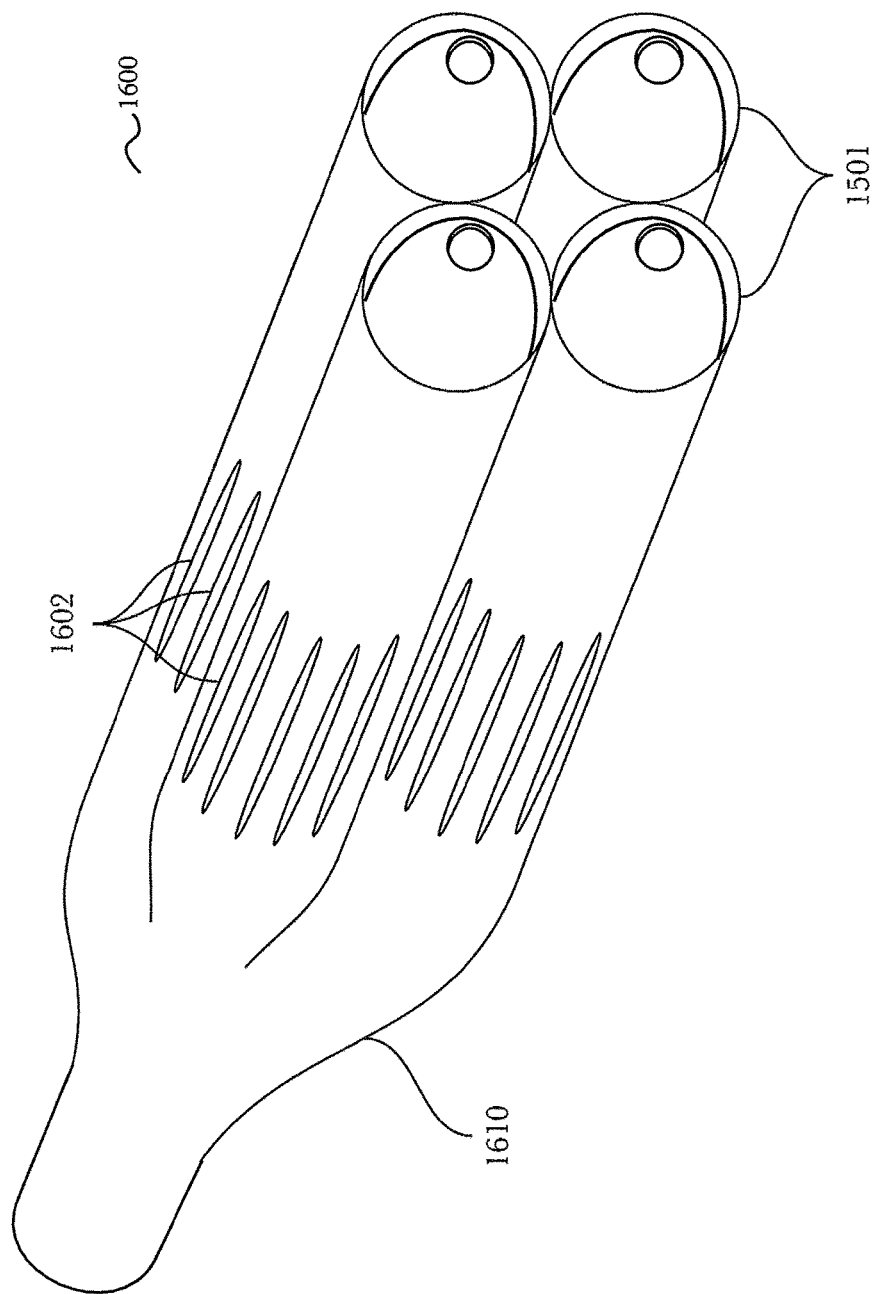

FIG. 16 is a diagram of an alternate arrangement of channeling gas flow tubes according to an embodiment of the invention.

Figure 17A:
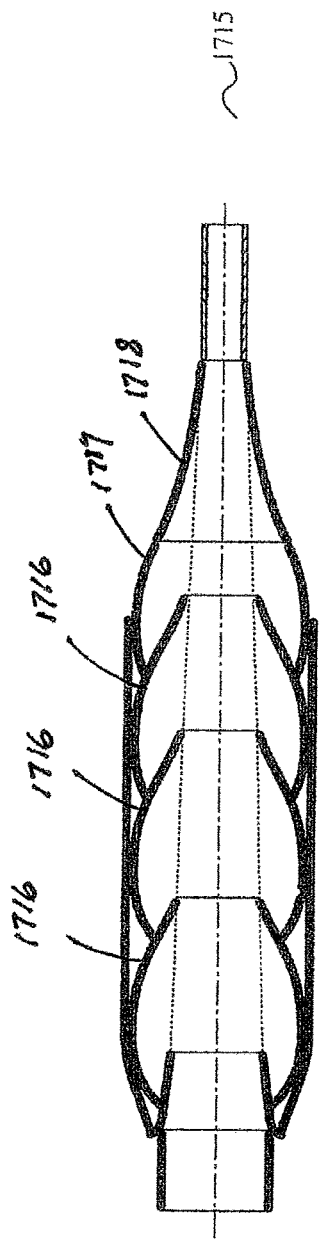
Figure 17B:
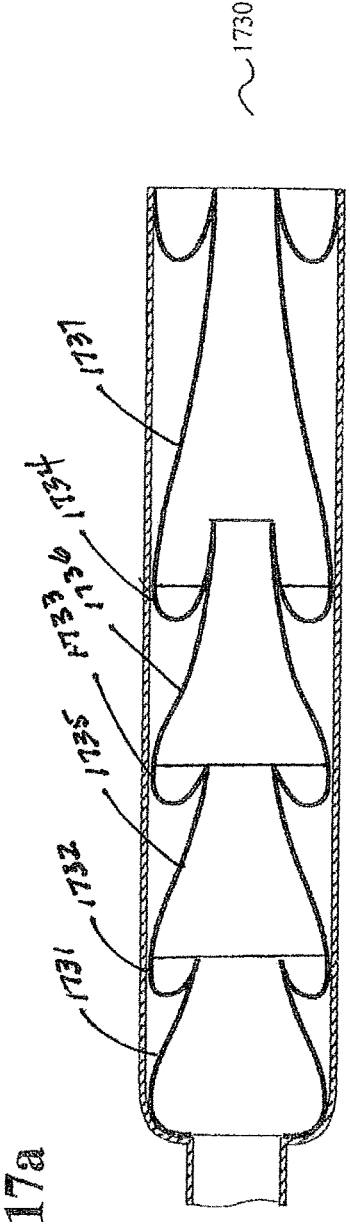
Figure 17C:
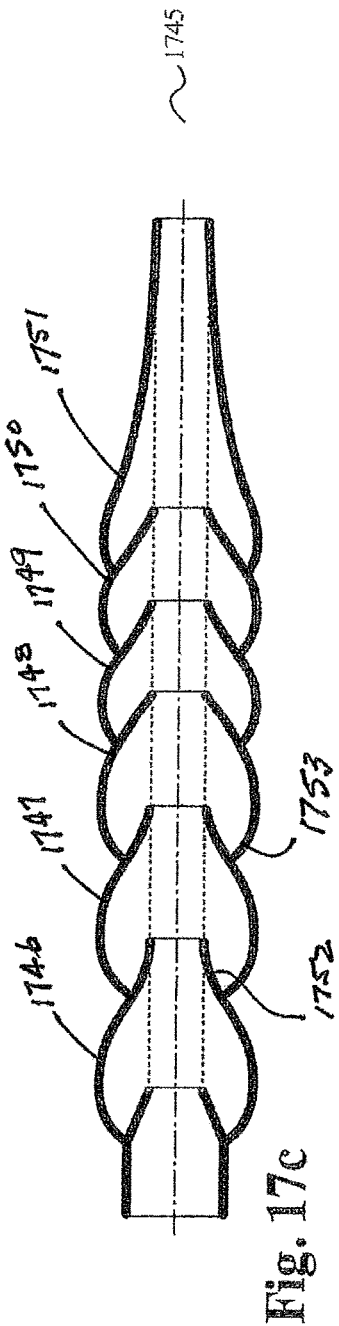

FIGS. 17a-c illustrate a number of shapes that will succeed as waveguide guides for gas flow tubes including in some instances mufflers showing the way construction might proceed by pressure forming tubular metal goods.

FIGS. 17*d-f* are diagrams to assist in explaining how waveguide configurations might be varied to achieve desired effects.

FIGS. 18*a* and 18*b* illustrate how a construction in accord with this invention might be adapted to a tube with a rectangular cross section or used to cover a surface.

FIGS. 18*c-e* illustrate how a construction in accord with this invention might be adapted to a spoiler device for automobiles.

Figure 19A:
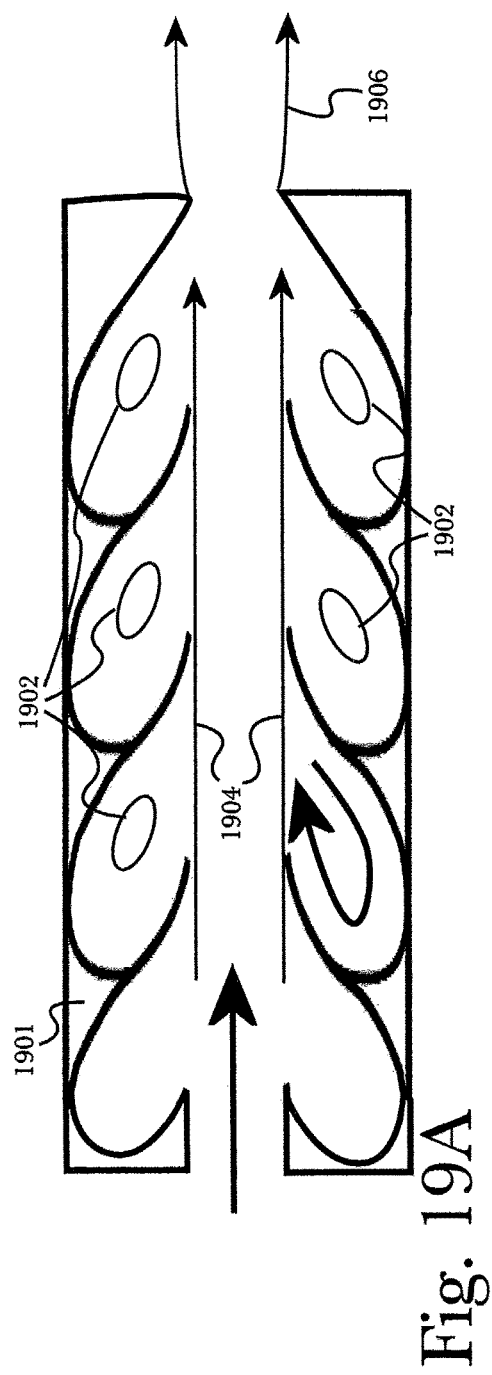
Figure 19B:
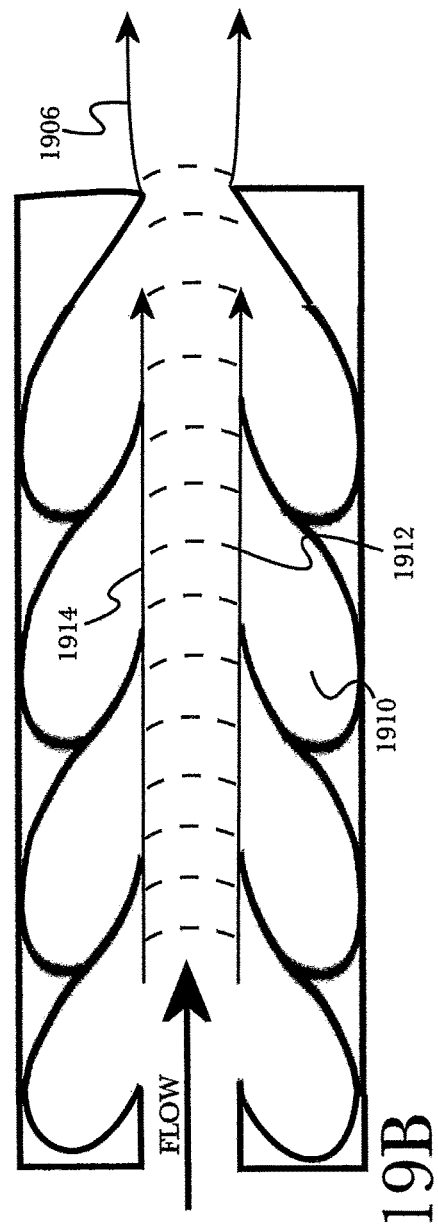

FIGS. 19*a* and 19*b* are illustrations of an experiment of the inventor that shows how vortices form when gas flows past waveguides in accord with the invention and how the exit gas pattern is under expanded as compared with an exit stream from a non-waveguide tube.

Figure 20C:
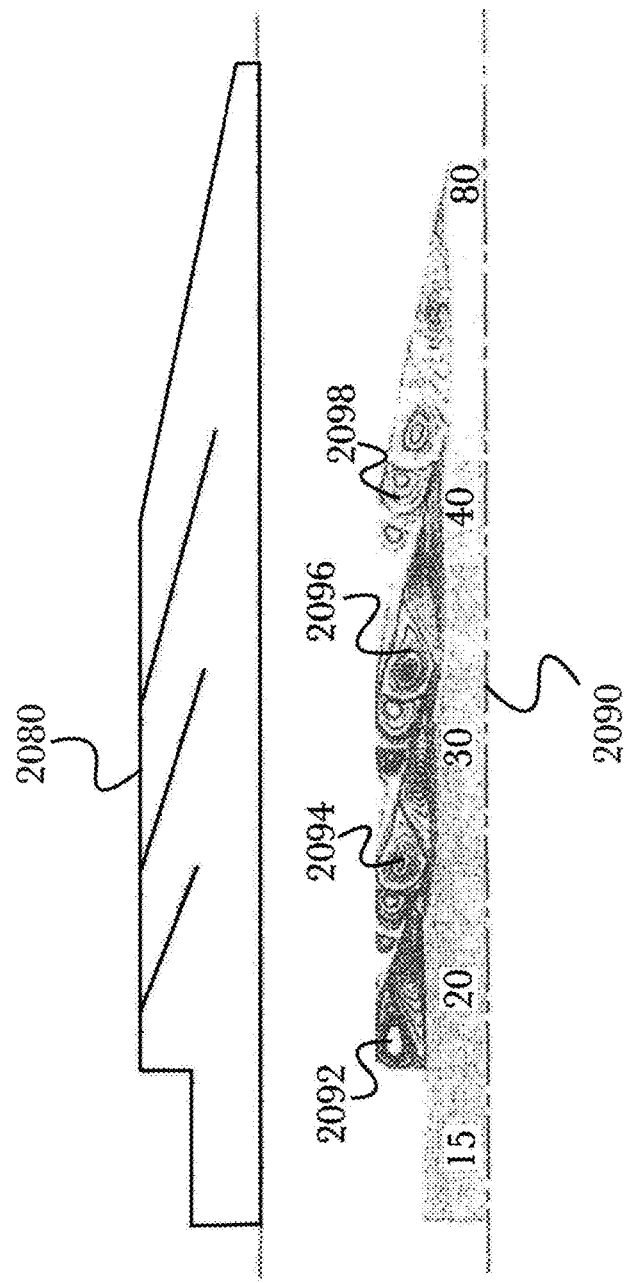

FIGS. 20*a-c* show the results obtained from computer simulation showing streamlines and velocity domains waveguide structures confirming vortex and boundary layer formation.

Figure 20D:
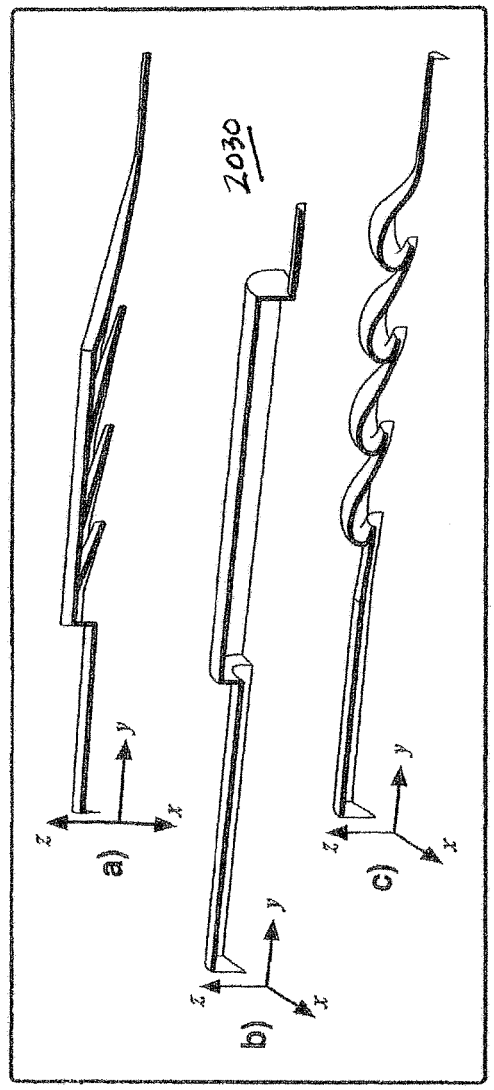
Figure 20E:
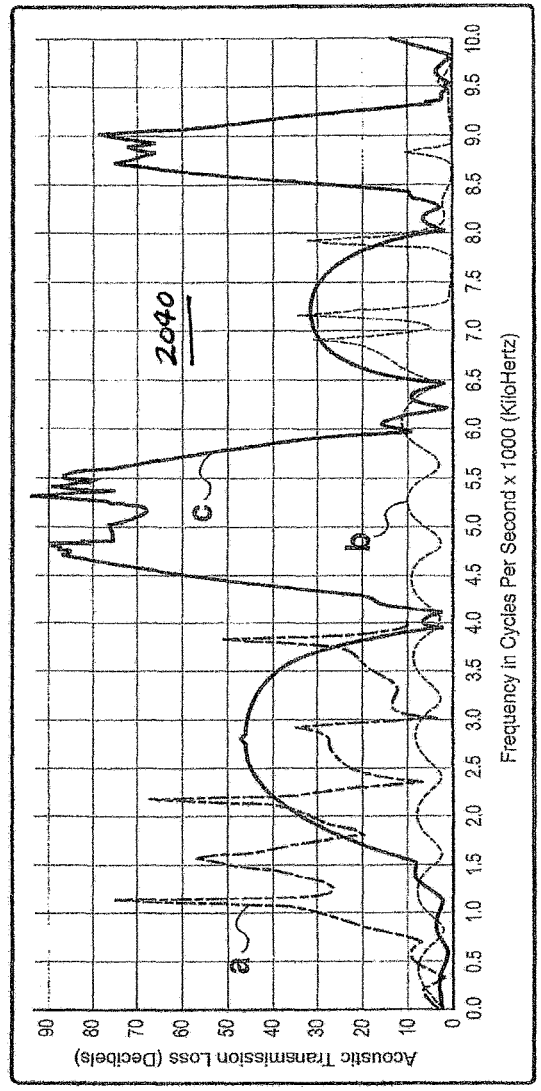

FIGS. 20*d-e* show the results of another computer simulation of the acoustic transmission loss imposed upon an exhaust signal by a four lobe waveguide structure in accord with this invention.

FIGS. 21*a-c* illustrate implementation of waveguide structures of this invention on wind turbine blades.

Figures 21D, 21E, 21F:
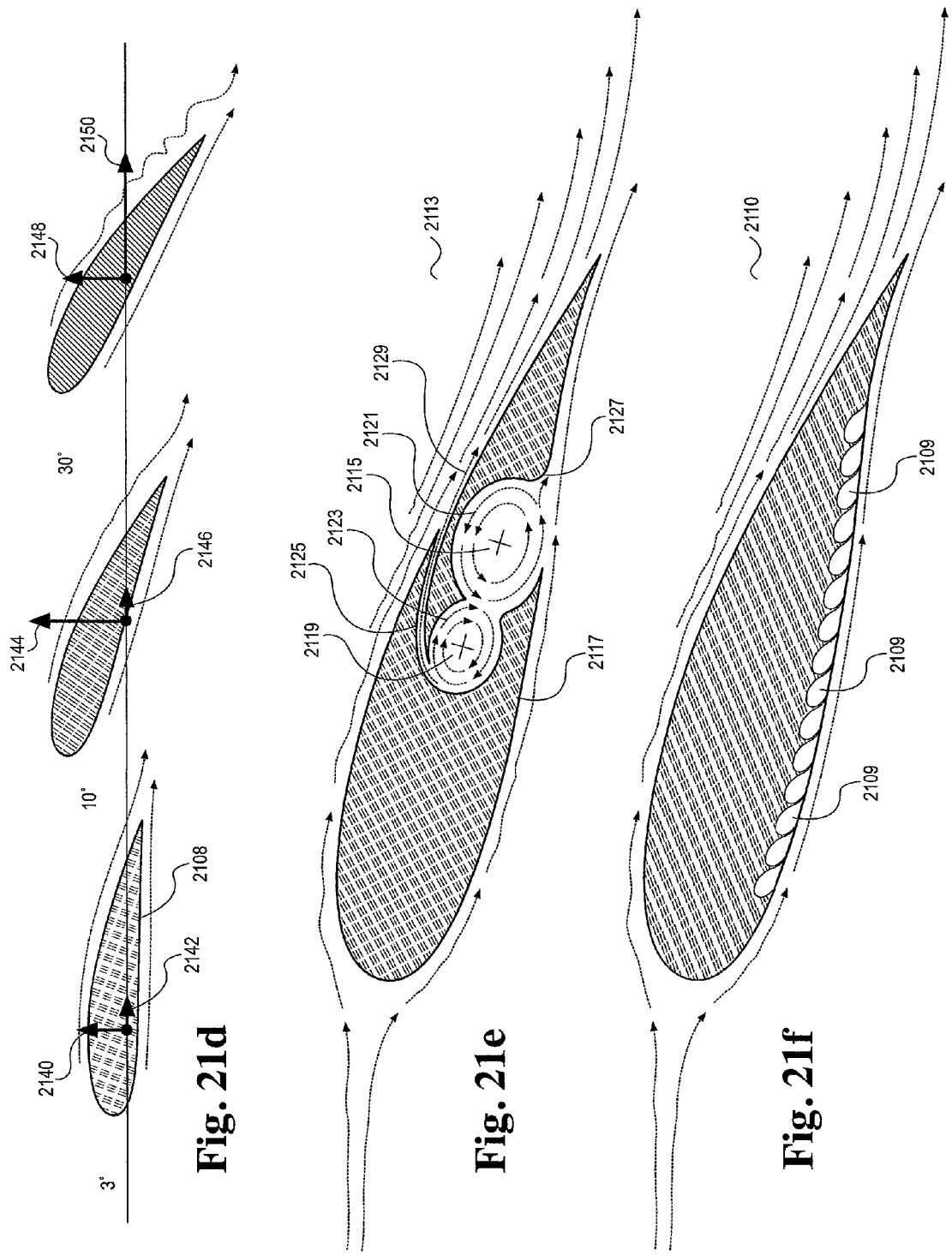

FIGS. 21*d-f* illustrate implementation of waveguide structures of this invention on airfoils.

DETAILED DESCRIPTION

The inventor has conceived, and reduced to practice, channeling gas flow surfaces and tubes that address the challenges and problems in the art outlined above. Various techniques will now be described in detail with reference to a few example embodiments thereof, as illustrated in the accompanying drawings. In the following description, numerous specific details are set forth in order to provide a thorough understanding of one or more aspects and/or features described or referenced herein. However, it will be apparent to one skilled in the art, that one or more aspects and/or features described or referenced herein may be practiced without some or all of these specific details. In other instances, well known process steps and/or structures have not been described in detail in order to not obscure some of the aspects and/or features described or reference herein.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DETAILED DESCRIPTION OF EMBODIMENTS

Figure 1:
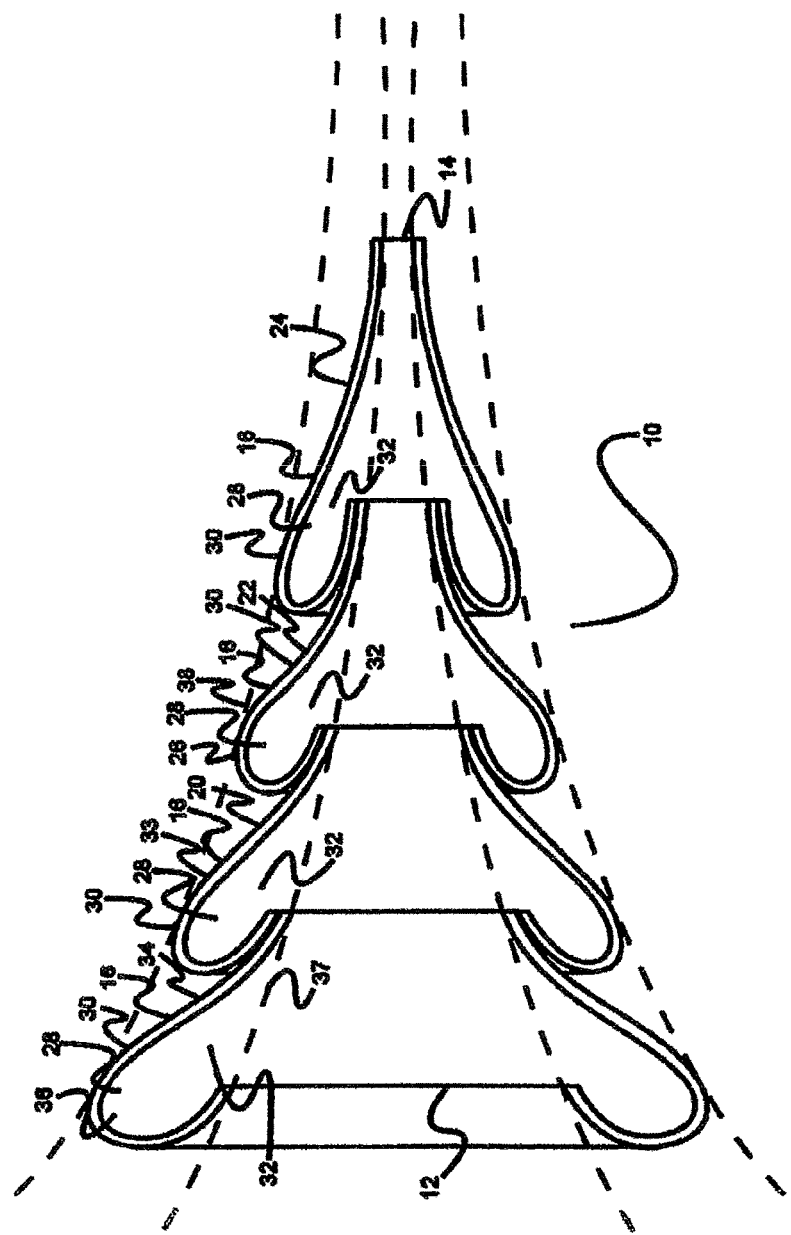
FIG. 1 is a longitudinal cross sectional view of a channeling gas flow tube, according to an embodiment of the invention.

FIG. 1 is a longitudinal cross sectional view of a channeling gas flow tube, according to an embodiment of the invention. According to the embodiment, tube 10 for moving gas 100 or for moving articles within gas 100 may be defined between an entry end into which gas 100 is introduced and an exit end through which gas 100 exits tube 10. Tube 10 defines a chamber into which the gas is conducted with the inlet having the general constriction of a venturi and comprises a plurality of adjoining adjacent guides 16, each guide 16 comprising a curved outer half of a approximating a modified torus forming toroidal grooves or waveguides opening inward. The chamber into which the gas is conducted from the entry end has an overall volume that permits expansion of the entry gas. Each guide 16 in this embodiment is adjacent to a next guide that is more constricted in diameter and volume, except of course the last guide 24, which ends the tube or chamber 10. The plurality of adjacent guides 16 connected together at their mouths forms a closed tube wall 26 with each guide 16 forming a cavity 28 with a cavity wall 30 around the cavity 28 and a cavity mouth 32 opening into tube 10.

According to a preferred embodiment, cavity wall 30 of guide 33 extends upward beyond its mouth 32; that is, toward entry end 12, over a next prior adjacent guide 34, again except a first guide 36 at the entry end 12 which is also shaped generally similar to the other guides but does not extend over a prior guide. The plurality of guides 16 is disposed within the chamber such that the mouths 32 of guides 16 are aligned along a curved inner line 37 between entry and exit ends 12, 14. The curved inner line 37 may be logarithmic or parabolic or another form of a continuous curved line. Also, an outer line 38 tangential to cavity walls 30 of said plurality of guides 16 outside of tube 10 is curved, which line may be logarithmic, parabolic or another form of a continuous curved line. Clearly, line 38 outside tube 10 has a curvature greater than curved inner line 36 past guide mouths 32.

Guides 16 are shaped such that a vortex 40 forms within each cavity 28 as gas 100 passes through tube 10, while promoting smooth flow through tube 10. Thus, cavity wall 30 of each flow guide 16 in extending past the next prior flow guide 34 loops back toward exit end 14 to taper into a smooth connection with that next prior flow guide 34. Guides 16, in this embodiment are generally nozzle shaped, with each successive guide being smaller than a next prior guide such that gas entering entry end 12 is funneled through tube 10 and out exit end 14, which is smaller than entry end 12.

According to another embodiment, the plurality of guides 16 is disposed such that outer line 38 tangential to cavity walls of said plurality of guides outside of tube 10 is straight.

Figure 2:
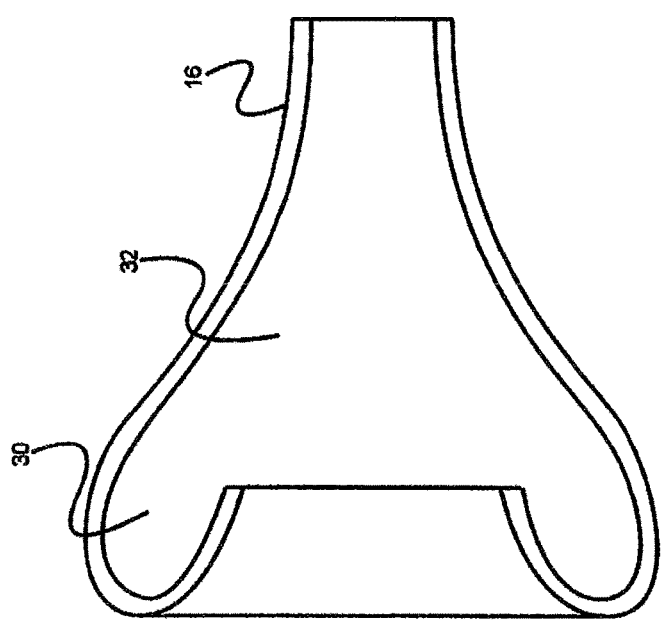
FIG. 2 is a longitudinal cross section view of a typical guide of which the tube of FIG. 1 is comprised.
Figure 3:
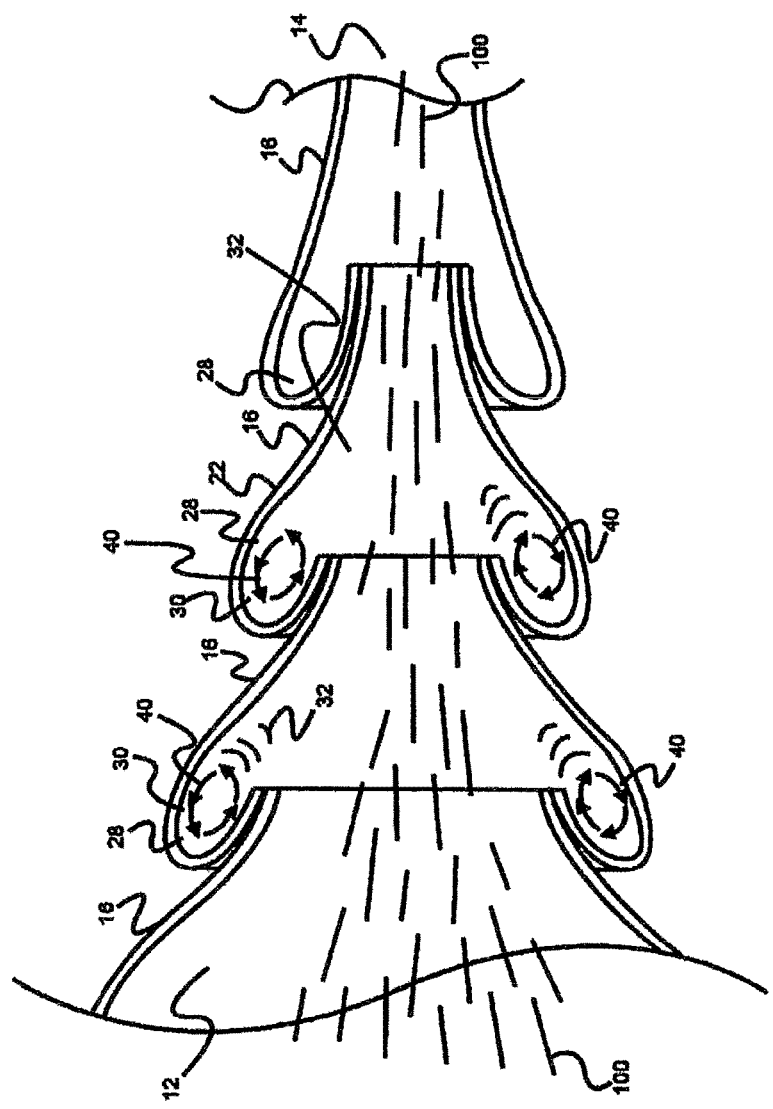
FIG. 3 is a longitudinal cross section view of a portion of the tube of FIG. 1 showing vortices in cavities of the respective guides comprising the tubes.

FIG. 2 is a longitudinal cross section view of a typical guide 16 of which the tube or chamber of FIG. 1 is comprised. FIG. 3 is a longitudinal cross section view of a portion of the tube of FIG. 1 showing vortices 40 in cavities of the respective guides comprising the tubes. According to the invention, vortices 40 are established shortly after flow 100 is commenced, with each vortex 40 arising naturally from edge effects of flow 100 when it encounters mouths 32 of cavities 28. It is one of the advantages of the invention that, once vortices 40 are established, and particularly when sizing of cavities 28 is accomplished as described above, the direction of flow in vortices 40 at mouths 32 is always in parallel with, and aligned with, the bulk of flow 100. Wind tunnel experiments conducted by the inventor have shown that this effect of vortices 40 results in development of a smooth boundary layer running substantially along line 37. This boundary layer may effectively entrain fluid in flow 100, thus accelerating flow 100 or reducing drag on flow 100 normally caused by normal edge effects experienced by a fluid flowing along a surface.

The vortex 40 formed inside cavity 28 is formed from the fluid flow 100 moving past cavity 28, and establishes a stable structure of fluid, with angular momentum that is also compressible. A compressible form, whether mechanical or fluidic in nature, is known to have the ability to absorb shocks (that is, shock waves or sudden, severe compressions waves). In the case of the stable fluid structure here, the absorbed shock is either transformed into additional rotation, or absorbed in the same manner as would be accomplished by a spring or mechanical shock absorber.

Figure 4:
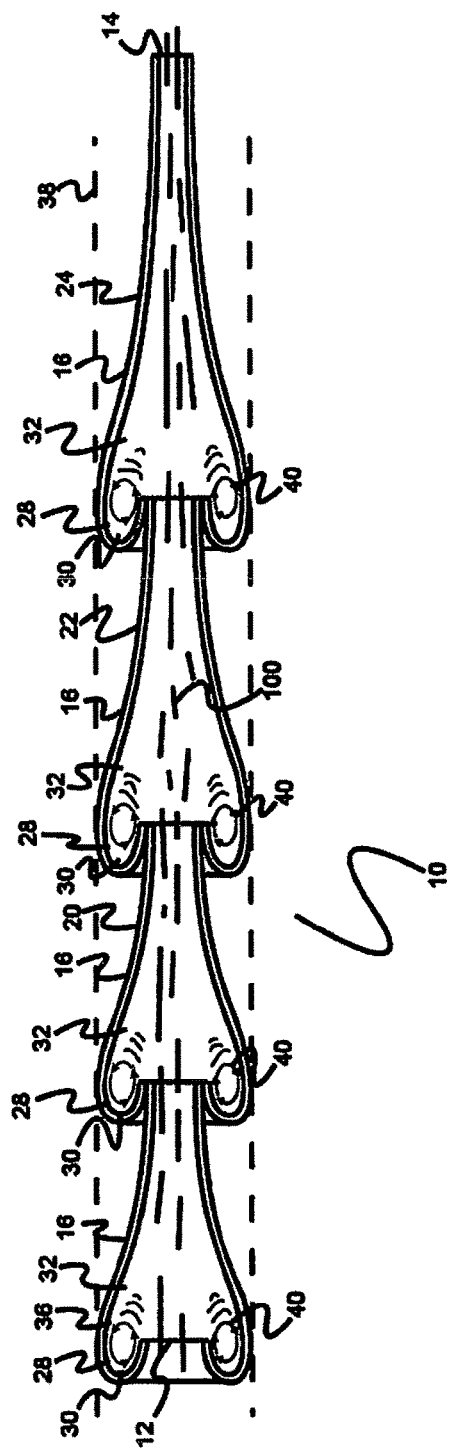
FIG. 4 is a longitudinal cross sectional view of an alternative embodiment of the invention, showing an external straight line comprised of a plurality of guides with cavities in which vortices are formed as gas passes the cavities.

FIG. 4 is a longitudinal cross sectional view of an alternative embodiment 10 of the invention, showing an external straight line 38 comprised of a plurality of guides 16 with cavities 28 in which vortices 40 are formed as gas passes cavities in the chamber from entrance 12 to exit 14.

Figure 5:
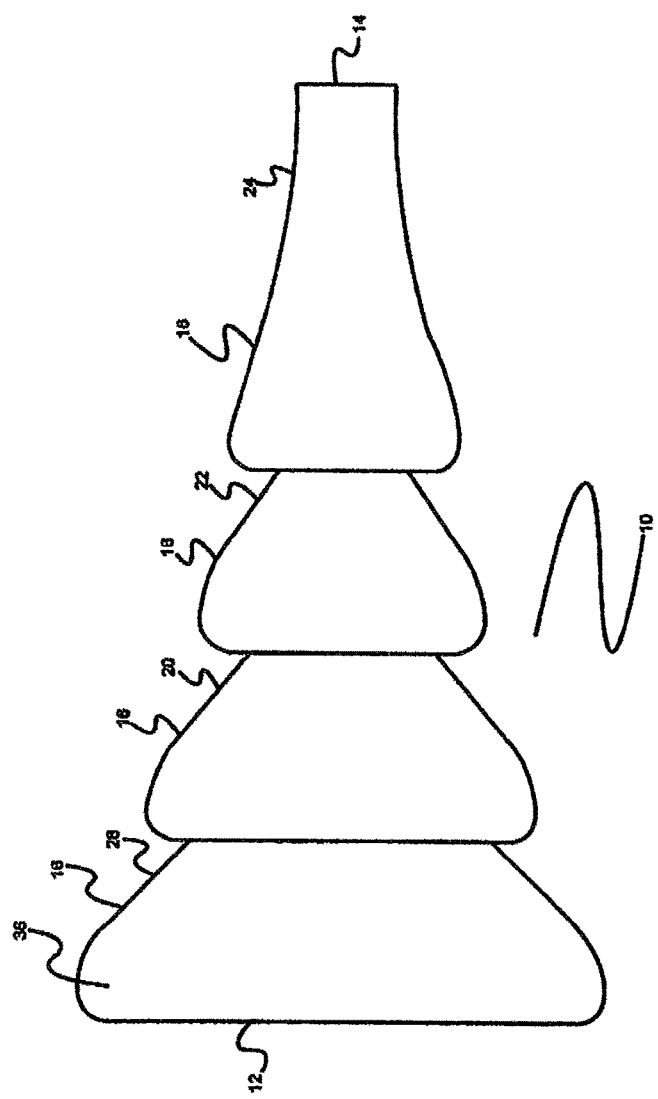
FIG. 5 is a perspective view of the tube of FIG. 1.

FIG. 5 is a perspective view of the exterior of tube 10 of FIG. 1.

FIG. 6 is a diagram of a novel muffler 600, according to a preferred embodiment of the invention. According to the embodiment, muffler 600 comprises a forward exhaust gas intake 601, a main body 604, and an exhaust gas exit 605 located distally from intake 601. Muffler 600 further comprises, at the forward (that is, distal from exit 605) end of body 604, an external shroud 602 which is penetrated by a plurality of air intake vents 603 generally aligned axially along shroud 602 (although other arrangements are possible; the arrangement shown is merely exemplary; furthermore, some embodiments may omit shroud 602 and vents 603 altogether). As in the case of tube 10 shown in previous figures, exhaust gas flows from intake 601 to exit 605 through the chamber defined by the flow guides in a generally axial direction relative to muffler 600. Internally, muffler 600 is comprised of a plurality of guides 611-614 of progressively greater length (proceeding axially from intake 601 to outlet 605). Optionally, interior surfaces of guides 611-614 may be modified along their portions 621-624 that are downstream of each guide's vortex-inducing cavity, in effect harnessing a scaled-down version of the same effect as is used by the invention overall, to further smooth flow along the inner surfaces of guides 611-614. One role of the vortex rotation in cavities 611 is to act as a "mixer" that dissipates pressure pulses originating from for example an engine's exhaust by converting it, via the vortex, into orderly axial motion. Also optionally, when vents 603 are used, exit component 605 comprises an inner surface 630 shaped to form a nozzle 650 at the exit of the final guide 614 of the waveguide chamber, such that the passage of fast-flowing fluid (exhaust gases) through the nozzle will create a low pressure point and therefore entrain air that enters via vents 603 and flows through plenum 640 (formed between the external walls of guides 611-614 and the internal wall of main body 604). This axial of cooler ambient air, caused to flow by the vacuum created by nozzle 650, acts to cool external surfaces of muffler 600 and to also cool the exhaust gases exiting from final guide 614 and passing through nozzle 605. It has been found, as described above, that the entrainment of exhaust gases by the boundary layer cause by vortices 40 in guides 611-614 may actually draw a slight vacuum on an engine emitting the exhaust gases, in contrast to the usual effect of mufflers, which exert a back pressure on the engine, reducing its efficiency. Moreover, the embodiment may optionally be outfitted with a turbine shaft for a high-torque turbocharger, in which the shaft extends forward and outside of the embodiment to drive a pump for a secondary air injection (turbocharging).

The muffler 600 shown is generally a circular cylinder in length and hence substantially circular in lateral cross section. However, those skilled in the art would appreciate that the cross sectional configuration may resemble any closed figure. Indeed many commercial mufflers of prior art construction are generally oval in lateral cross section, and those of skill will appreciate how the internal waveguides can be adapted to an oval or even a square or rectangular lateral cross section. (See FIGS. 18a and b discussed below.)

FIG. 6a shows another alternative and simplified construction of a circular cylindrical muffler 651 that utilizes a series of straight frusto-conical waveguides within the waveguide chamber to achieve improved noise attenuation as well as improved engine performance believed to be ascribable to elimination of back pressure on the engine exhaust. A longitudinal half section perspective view is shown in FIG. 6b. Engine exhaust enters muffler 651 through port 652 and is conducted into a chamber past a series of four waveguides 653, 654, 655, and 656 to the exit port 660 through a central channel that is generally unobstructed. The entry port 652 does not have the characteristics of a venturi, but in this case, guide 653 acts as the first waveguide and provides the desired venturi effect. The waveguides are frusto-conical shells that are securely mounted within an outer cylindrical casing 657 by welding, riveting or otherwise fastening the shells using collars such as 659 that are provided at the wider terminus of each of the frusto-conical shells. Each of the frusto-conical shells presents a surface to the entering flow that is inclined in the direction of flow and defines a waveguide cavity, e.g., 661 between the downstream terminus of each shell, the outer casing 657, and the next adjacent downstream shell. The muffler illustrated shows frusto-conical shells 653-656 of increasing length and decreasing angular inclination to the axis of the gas flow through the device as was the case in the FIG. 6 embodiment. However, as will be addressed below, it is not necessary to increase the length of each waveguide, and maintaining the guides at uniform spacing and angular inclination to the axis of flow provides satisfactory results and improvement over prior art mufflers.

The waveguide cavities 661 that are defined behind the waveguides in muffler 651, moreover, also differ from the guide cavities in the muffler 600 of FIG. 6. The cavities in muffler 651 are all angular in cross section as can be seen and do not possess the toroidal curvature of the cavities in muffler 600. Provision of curved and toroidally bounded waveguide cavities improves the capacity of the wave cavities to support the formation of gas vortices during use and thereby improve the formation of a boundary layer of gas that transits generally in the vicinity of the edges of the waves. However, vortices are induced within the "angular" guide cavities in the muffler of FIG. 6a, albeit perhaps more fragmented vortices. Observation has indicated that vortices are created in the angularly configured wave cavities of muffler 651, and that beneficial sound attenuation and reduction of engine backpressure can be achieved.

In the curved wave cavities of FIGS. 1-6, there is typically an inflection point that appears in the anterior or downstream side of each wave cavity where the curvature changes from turning inwardly to form a concavity to turning outwardly toward the direction of flow. The inclusion of such an inflection point particularly in tubular devices enables the creation of a waveguide cavity which has a posterior region that is curved to accommodate and encourage vortex creation and an anterior region where waveguide cavity mouth opens to flow from inlet to outlet. The inclusion of such an inflection point in the configuration of the wave cavities of this invention is preferred particularly in tubular constructions to transmit gases but is not essential. In applications where the waveguides are formed on a surface intended to experience unidirectional flow like a projectile or an airfoil, the inflection transition is not as contributing to superior performance.

For example, a muffler called "E-1" substantially in accord with the configuration of muffler 651 of FIG. 6a was tested on a 1999 Suzuki GSX1300R Model motorcycle (4 cylinder 1300 cc. displacement, fuel injected model). Comparisons were made between the E-1 muffler and a commercially available OEM Akropovic Model S-513502-HRC, a three-chamber resonator-type motorcycle muffler. Temperature readings were taken at each muffler's inlet and exhaust ports as the motorcycle was run at idle, then at 3500 rpm, then at 2500 rpm, then down to idle, and then off Pressure measurements were also taken from the center of the unobstructed passage of the E-1 muffler positions downstream of the end of frusto-conical shells 618 and 620 and at what were estimated to be comparable positions on the OEM muffler. Temperature observations indicated that although inlet temperatures at the plateau of 3500 rpm operation were about 160° F. hotter (indicating a leaner engine burn) for the E-1 as opposed to the OEM model at 3500 rpm, the exit temperatures at those operating conditions were comparable. That is, the E-1 muffler did a superior job of cooling the exhaust stream. Moreover, pressure readings indicated that the E-1 was drawing a 0.5 psi vacuum on the inlet stream between the two measuring positions, whereas there was no measurable vacuum generated in the OEM muffler. Dynamometer measurements of horsepower and torque with each muffler indicated small improvements in both output factors for the E-1 over the OEM muffler.

Minor modification to muffler 651 to introduce a curved boundary to the posterior of the wave cavities may moreover be readily achieved by artisans familiar with metal forming and manufacturing techniques. For example, an annular ring of material affixed in the angular space between the frusto-conical shells and the casing 657 could be formed with a curved surface that approximates a half-toroidal surface to introduce curvature to the wave cavities of the muffler 651 which the inventor believes will improve performance.

FIGS. 6c-e are illustrations of alternative constructions of a muffler in accord with this invention. Specifically, FIG. 6c shows a longitudinal section of a muffler that has been installed on a Dodge Ram 250 truck for test purposes. The muffler of FIG. 6c may be installed upstream or downstream of the catalytic converter (as can all the embodiments herein with suitable adaptation). For ease of illustration, FIG. 6c shows a longitudinal section of a muffler construction 662 composed of five guide cavities of equal size and displacement along the axis of the muffler formed by bolting together an inlet nozzle adapter 663 defining the inlet that will accept the engine exhaust and is shaped to create a venturi effect. Each cavity is formed with a curved posterior portion that has an inflection point on the back side of each wave. The inlet nozzle cooperates with first wave disc 664 to conduct the exhaust gases into chamber 665. Four additional interfitting waveguide discs identical to 664 are coupled together to form the body of the chamber 665 with an outlet adapter 666 (with an alternate adapter at 667 in FIG. 6d) to create a completed assemblage of the muffler.

The muffler was fabricated for testing purposes by machining block aluminum into the shapes illustrated. Aluminum, however, may be deleteriously subject to corrosion in the environment of a muffler and it is anticipated that stainless steel would be a more appropriate material for this purpose. It is not anticipated however that machining a muffler from block stainless steel would be economically feasible. So, for example, a likely mode of manufacture is discussed below in connection with FIG. 6e would be to pressure stamp a sheet of stainless steel or aluminized stainless steel having a "donut" shape into a shape approximating a half toroid to form the posterior portion of each waveguide cavity ("posterior" being determined as the portion of each waveguide that is on the chamber inlet side of the guide cavity). That half toroid could then be joined with a flared tube that would form the anterior portion of each waveguide and secured within a cylindrical housing to create the muffler.

Such a manufacture will be discussed in connection with FIG. 6e. Alternatively, the muffler of FIG. 6c can be manufactured by fabricating longitudinal half sections of the device in suitable steel sheet goods and securing the half sections together. Such techniques of manufacture will be apparent to those of skill in the art.

FIG. 6c is shown in with demarcations between the discs in the shape of 664 to facilitate understanding of how cooperating parts can be designed. The individual parts of the assembly should be provided with alignment keys so that when members 663, 664, and 666 are properly assembled, the bolthole 668 for receiving bolt 669 is aligned to bind the assemblies together. Although the illustration is a five cavity assembly, it will be understood that lesser or more cavities may be optimum for specific applications It is advisable that in creating a muffler in accord with this invention, the inlet port be very closely the same in diameter as the exit port, since the muffler design enables the creation of a small vacuum in the muffler encouraging outflow of engine exhaust. That phenomenon not only eliminates the backpressure problems existent with many prior art mufflers, but also actively marginally increases the efficiency of engine performance. Generally for vehicle mufflers suitable for vehicles ranging from motorcycles and passenger cars to large trucks and busses, a repetition of four to ten guide cavities provide a sufficient array to accomplish engine noise moderation and maintain flow without creating engine backpressure.

As of the present time, the observations forthcoming from the placement of the muffler of FIG. 6c on the Dodge 2500 truck featuring a 5.9 liter turbo diesel engine have been anecdotal as opposed to scientific. However, the driver/operator of the truck, experienced with the vehicle both before and after installation of the FIG. 6c muffler reports a gas mileage improvement of more than 3 miles per gallon, elimination of "turbo lag" when accelerating quickly, higher torque at engine speeds in the lower half of its operation band and a different and somewhat softer exhaust sound.

To afford some context to the FIG. 6c device tested as disclosed above on the Dodge RAM 2500, the overall outside diameter of the muffler is 4.5 inches. The central unobstructed passageway is about 1.7 inches across, and the length (along the axis of the device) of each wave disc 664 is 1.25 in. in length. The waves have a sweep or approximate angle from the vertical as illustrated in FIG. 6c of about 32°. Sizing of the inlet will depend upon the application, but typically, muffler lengths of 4 or 5 waves will have broad applicability. As discussed below, the number of waves or waveguides in a muffler is likely dependent on the strength of the pressure pulses generated by the engine. The overall size including entry and exit ports is more dependent upon the volumetric output of the engine. Public information sources publish the volumetric flow rates of exhaust streams for many vehicles. The flow rate for the exhaust of the Dodge truck was 1131 cubic feet per minute. Inasmuch as the muffler discussed above in FIGS. 6c, d and e was reportedly causing the operator to report that the exhaust flow seemed to be restricted at full power, it was estimated that the outlet might be expanded to from 1.87 inches to 2.25 inches. Based upon these estimations, it is believed that a good estimate of outlet size for vehicle volumetric flow rate would be to establish a ratio of about 3000 to 3500 cfm per square foot of outlet opening (the estimation yielded a result that the 1131 cubic feet of exhaust would likely be well handled by an outlet size of 0.3313 sq. ft.).

The size of the exit port defined by member 666 should not be substantially less than the inlet port defined by member 663 and in the illustrated embodiment is about 1.87 inch. It will also be understood that although the embodiments disclosed have been exemplified in the context of an overall muffler of circular cross-section, the configuration of the embodiments may be modified to create devices of oval, square or even rectangular cross-section as discussed above. One experimental indicator that can assist in determining the spacing of the cavities in a muffler is to examine the exhaust stream entering the muffler before placing the muffler on the engine exhaust. The examination of the exhaust stream searches for manifestations of Kelvin-Helmholtz ("KH") instability. This can be done by, for example, introducing a colored smoke or very fine powder into the exhaust stream at its exit point and photographing the stream. The spacing between any perceived KH instabilities is a good indicator of the spacing between cavities and therefore should also enable approximation of the guide cavity depth and size.

FIGS. 6d and 6e show different exhaust ports on devices similar to that in FIG. 6c. FIG. 6d shows an exhaust venture with an angled exit port which assists in directing the exhaust in the direction of the angle. FIG. 6e (discussed below) shows a muffler with an exhaust that is substantially larger than the venture inlet, which would more typically be for a high volume gas exhaust engine.

The greater purpose of FIG. 6e is to show how the mufflers of the earlier figures (FIG. 6c) might be constructed from sheet and tubular goods made from, for example, aluminized steel which is used for muffler construction. Muffler 670 can be so constructed with annular pieces 674 being formed from planar "donut" shaped blanks and cooperating pieces 675 being formed from pressure-expanded tubular goods. Pieces 674 and 675 can then be joined at the point where they contact outer casing 676 by, for example, spot welding. Likewise, entry and exit pieces 672 and 677 may be pressure formed from tubular goods.

Experimental observation of vortices in various devices with wave cavities by the inventor would support the notion that a muffler that did not have a series of separate flow cavities but rather was configured with a helical wave cavity similar in cross-section to that in FIG. 6c would be successful. Indeed any of the above illustrations might be alternatively constructed with a helical cavity that winds down the muffler annularly. Although in one sense a single cavity, such a structure would present a series of waves with edges to the incoming gas flow. In such a device, the gas flow that enters the muffler chamber would nonetheless be presented with a series of waves that served as the boundary of a wave cavity. Accordingly, when the written description herein indicates that the muffler chamber presents incoming gas with a series of successive waves, it shall be understood that the waves may form the boundary of individual guide cavities that the incoming gas encounters successively or form the boundary of a helical wave proceeding down the length of the muffler chamber. Despite there being a singular helical surface, such a structure will present a succession of waves to the oncoming flow.

FIG. 7 is a diagram of a novel appendage for a projectile propelling device such as a firearm, or air gun (including, e.g., a paintball gun, and hence the term "gun" will be used to generically encompass all these projectile-propelling devices) that functions as a suppressor or silencer 700, according to an embodiment of the invention. According to the invention, silencer 700 is placed at the open business end of a gun barrel 702, and emits both bullet or projectile 730 and high velocity gases 725 contained within inner wall 701 of barrel 702 at intake 720.

It will therefore be understood that whereas the exemplary embodiments discussed above are intended to be used in the context of a device having an incoming gas flow that is decreasing in velocity as the gas proceeds through the device, the use of the principles of this invention in a silencer or suppressor for a gun involves an accelerating gas flow proceeding through the device. It has been found that the devices of this invention not only suppress the report and the flash of a gun, but also can increase projectile velocity and range.

Silencer 700 comprises an external rigid tubular wall 710, which encloses a cylinder defined by its inner wall 711 enclosing a chamber that provides an unobstructed path to the exit into which the expanding gases and the projectile itself is introduced. Aligned along inner wall 711 are pluralities of guides that form guide cavities 721a-n, each of which operates as described above to establish vortices 726 that in turn act, via each cavity's mouth, to align force vectors axially along the unobstructed interior of the cylinder through which bullet 730 passes. Typically, the open passage between the edges of the guides is incrementally larger than the projectile being propelled with an allowance for the fact that the clearance between the guides and the projectile will decrease as the hardness and speed of the projectile increases. In the art, this planned clearance between the projectile and the waveguide edges is about 0.04 inch (1 mm.) to avoid "baffle strike." A paintball projectile would accordingly be expected to utilize a suppressor with a greater unobstructed opening between the guides than would a lead or steel projectile from a firearm cartridge. Although FIG. 7 shows nineteen such uniformly configured cavities, subsequent experimentation has indicated that in a typical high powered firearm as few as five to seven or eight cavities are sufficient. In a lower velocity gun such as a paintball gun, it is believed that four cavities are sufficient. Spacing between cavities can be approximated by experimentally observing the KH instabilities of the unsuppressed gun blast. Such observation assisted the formulation of the spacing on the silencer of FIG. 7 which was tested on a 30 caliber assault rifle which without a suppressor showed a KH interval of about 0.4 inch, and that observation informed the construction of a silencer for a 30-caliber rifle with guide cavities being sized at 0.4 inch along the axis of the silencer. That dimension is illustrated at 735.

Importantly, shock waves present in gases 725 exiting a gun's barrel 702 after firing of bullet 730 are dissipated by the action of the plurality of guides 721a-n, such that a substantial portion of the kinetic energy of such shock waves is dissipated by setting up vortices 726 (since prior to firing vortices 726 would not typically exist), each cavity 721a-n acts to reduce the energy of incident shock waves by receiving gases and establish vortices 726. Furthermore, the aligned force vectors and the resulting smoothed boundary later moving axially may accelerate bullet 730. As with the muffler applications discussed, the successive waveguide structure shown can be replaced by a waveguide structure defined by a helical waveguide proceeding down the length of the suppressor/silencer. Moreover, it has been observed that exhaust gases exiting silencer 700 tend to be highly collimated, with the result that heat and sound are carried rapidly away from silencer 700 (and thus from the person who fired the gun). This collimated jet of exit gases differs from the splayed gas pattern exhibited by a commercially available suppressor/silencer on the same weapon. It is believed that this highly-collimated exit gas geometry, coupled with the incremental acceleration of bullet 730 by the conversion of shock waves into vortices 726 will serve to increase the range of a given ammunition type by establishing a higher bullet exit velocity and reducing drag when bullet 730 initially leaves silencer 700.

As indicated above, the same configuration of suppressor can be used on lower velocity applications such as paintball guns for recreational use. (Paintball guns for recreational use generally shoot paintballs at not exceeding to 300 feet per second.) Paintball projectiles are available in various diameters of 40, 48, and 50 and up to 68 calibers. Brief testing of a suppressor design on a recreational paintball gun yielded anecdotal evidence that a silencing effect was realized and that an improved target pattern was realized when recreational paintball gun was tested using a suppressor of this invention as opposed to the same gun without the suppressor.

FIG. 8 is a diagram of a novel firearm ammunition design, according to an embodiment of the invention that departs from the notion that waveguides are used in tubes and posits the use of waveguides to improve fluid flow over surfaces. Bullet or projectile 801 has been modified, according to the embodiment, in that bullet 801 comprises a plurality of circumferential cavities 803a-n and 802a-n inclined in the direction of fluid flow over the surface of the projectile similar to cavities 28 above. Cavities 802a-n, 803a-n are generally half-toroidal, each forming a circumferential complex surface of rotation around the centerline of bullet 801. The projectile surface in which the 803 cavities are formed is more inclined toward the anticipated flow of fluid around the projectile than are the 802 cavities that are formed in a surface anticipated to be parallel to anticipated flow. The 802 cavities would have a configuration generally conforming to that of the guide cavities in the mufflers and suppressor/silencers although they are spaced apart along surface 802 and are not adjacent as are the guide cavities in the embodiments in FIGS. 6 and 7. This spacing avoids the possibility that the guide surfaces would be crushed or damaged when placed inside the cartridge shell. The 803 cavities, because of their greater inclination to anticipated flow have an exit ramp that is more extended than the exit ramp of the 802 cavities. Since the angle of the anterior 802 cavities to the anticipated flow during projectile flight is different than the angle of the more posterior cavities, the angle of the centerline if the cavities will increase slightly for more posterior cavities. This will be further exemplified in the context of the dimensions of a standard 223 Remington bullet.

Similar to the mechanisms described above, cavities 802a-n, 803a-n enable vortices to be established within their respective interiors. Cavities 803a-n are distributed along the curved forward portion of bullet 801, and cavities 802a-n are distributed along the cylindrical after portion of bullet

801. Collectively, these cavities 802*a-n*, 803*a-n* cause a smooth boundary layer to be established, as described above, and thus reduce aerodynamic drag on bullet 801. Similarly, bullet 810 comprises cavities 812*a-n* along its curved forward end, for the same purpose. Additionally, bullet 810 has a modified rear surface 811, which instead of being planar comprises a half-toroidal depression, which allows vortices 815 to form, thus reducing turbulence at the trailing edge of bullet 810 as it travels through the atmosphere. Finally, the lower part of FIG. 8 illustrates a complete round of ammunition comprising cartridge 820 and a modified bullet 801 with the 802 cavities shown within the cartridge shell 820.

With respect to the sizing of the cavities on projectiles, FIG. 8*a* shows the overall dimensions of an available Remington 223 caliber cartridge. FIG. 8*b* shows exemplary dimensions for standard Remington 223 bullet (not the cartridge), which has a diameter of 0.2230 inch and a length of the bullet of 1.00 inch. All dimensions in FIGS. 8*a* and 8*b* are in inches. In FIG. 8*b*, other self-explanatory dimensions are shown of one specific embodiment being set forth. The depth of the 803-type cavities on the bullet's curved anterior section is 0.030 in. and the exit ramps for the 803-type cavities is determined by the angular variation as shown since the anterior of the bullet surface conforms to a radius. The 802-type are not shown on this embodiment, but if employed would have cavities of similar depth with shorter exit ramps. Larger projectiles would likely have larger cavities, although the velocity and mass of the projectile can affect cavity design and minimal testing should readily enable optimization.

FIG. 9 (PRIOR ART) is a diagram of a K-type firearm silencer known in the art, and is provided to show how the modified silencer 800 of FIG. 8 differs from the prior art. Specifically, prior art silencer 900, of a type known as "K-type", comprises an entrance 901 that admits high-velocity gases from a gun barrel, and a series of truncated conical sections 902*a-n*, aligned axially along the length of silencer 900 with their bases oriented toward the forward (exit) end of silencer 900. Each section 902*a-n* further comprises a plurality of holes 903*a-n* permitting high-speed gases to exit into plenum 910, thus dissipating compression or shock waves by converting them into turbulent flows and thereby reducing a gun's acoustic signature when fired.

Comparing the prior art silencer illustrated in FIG. 9 with the silencer embodiment illustrated in FIG. 7, several important differences may be noted. Typical K-type gun silencers feature circular expansion vents into surrounding expansion chambers. The singular compression wave from the gun blast is allowed to gradually expand. By contrast, according to the embodiment, the silencer of FIG. 7 works in the opposite way, with different stage contours with drastically different fluid characterization, and without expansion vents. According to the embodiment, the object is to conserve all the energy of the shockwave and use it as a work function to accelerate the flow (and therefore also to accelerate bullet 730), instead of following the approach of conventional silencers by providing "dead-end" expansion chambers where kinetic energy is lost due to cancellation effects. Allowing compression waves to expand and cancel creates an energy conservation condition where thermal heat is generated in conventional suppressor/silencers. In the embodiment, less heat is generated because the kinetic energy moves through the embodiment to increase the velocity of exiting gases (and bullet 730). In effect, the embodiment's toroidal cavity is a temporary domain where compression waves are "invited" to occupy the space, expand, spin and roll ideally as a singular ring vortex, and then to apply its "traction" to the throughput jet-stream, thereby accelerating it. Ideally, all the kinetic energy of the pressure impulse of shockwaves is translated into axial acceleration. Accordingly, although prior art suppressor/silencers can be exceedingly hot to the touch after use, use of the embodiment generated considerably less heat advantageously permitting the device to be more readily removed manually Note that it is possible to reverse the orientation of cavities 721*a-n* and thereby to cause an increase in exit pressure and a corresponding decrease in exit velocity; such an approach may be useful for example for a steam wand in an espresso machine.

FIG. 9*a* is a cutaway picture of a typical prior art muffler, although the prior art, including the patent art, discloses hundreds if not thousands of variations. The illustrated prior art muffler has an inlet pipe for the exhaust stream that passes through an resonator chamber to a larger chamber where the exhaust must exit through perforations either backwardly to the resonator chamber or to the outlet again through another set of perforations. In most prior art embodiments, the exhaust gas is made to travel tortuously through and past baffles and into absorbent material to reduce the sound. The mufflers of the instant invention appear to offer a solution by proceeding in a direction that the prior art has, for the most part, disdained.

FIG. 10 is a cross-sectional view of two modified airplane wings (or airfoils), each modified in accordance with an embodiment of the invention. According to the embodiment, airfoil 1000 is conventional in design, but further comprises a plurality of cavities 1001 along its leading upper edge. Cavities 1001 act in the same fashion as cavities described above, establishing vortices within the cavities and thus facilitating establishment of a smooth, low-drag boundary layer along the upper surface of airfoil 1000. Since realignment of force vectors by vortices within cavities 1001 will tend to accelerate fluid (i.e., gas) flowing along the upper surface, not only will drag forces on airfoil 1000 be reduced, but also lift will be improved since there will be a greater pressure differential between the lower and upper edges of airfoil 1000 compared to conventional designs. Airfoil 1010 is similarly conventional in design, except that it further comprises two set of cavities 1011, 1012, one on the upper surface and one on the lower surface of the airfoil 1010. This arrangement serves to reduce drag forces acting to retard motion (to the left) of airfoil 1010 through the atmosphere, although at the cost of no net effect on lift (as compared with airfoil 1000, which has drag reduced by a lesser amount but also has enhanced lift properties). It will be appreciated by one having ordinary skill in the art that various configurations of cavities are possible, according to the invention, each with its own benefits, and any of which may be used according to the invention.

Since the size of the airfoil and the anticipated speed of air over the airfoil can vary greatly, the sizing of cavities for an airfoil can also vary. The regimen of examining the KH waves generated by the airfoil in a wind tunnel provides an initial parameter to the spacing of cavities, and the size of the KH instabilities can be useful to estimate depth.

FIG. 11 is a diagram illustrating various aspects of a mechanism 1100 for converting turbulent flow into orderly flow, according to an embodiment of the invention. FIG. 11 illustrates a single typical stage of a device such as that illustrated in FIG. 1, and is provided here for clarity and more detail. According to the embodiment, gases (or any fluids) flow from inlet aperture or entrance 1120 through a tunnel volume 1123, exiting through an outlet aperture or exit along line 1103 and then displaying a thrust profile 1130 after exit (this profile may vary depending on operating point of the system). Volume 1121 is a typical cavity volume in which a vortex is established, and volume 1122 is a working volume with an outer wall comprised of a portion 1110 with a convex profile and a subsequent portion 1111 with a concave profile ("subsequent" in the sense that it is downstream relative to the gas flow 1123, which is shown going from left to right), the transition occurring at a point in length signified by line 1102.

FIG. 12 is a diagram showing exemplary modifications to a truck 1200 to reduce drag and improve fuel efficiency thereof, according to an embodiment of the invention. By some reports, a majority of the power generated by a class 8 truck tractor is utilized to overcome aerodynamic drag forces on a level road at highway speeds. According to the embodiment, various waveguide cavities may be established along various surfaces of truck 1200 along which airflow occurs during travel of truck 1200. For example, in some embodiments a truck's 1200 cab may be modified by the addition of vertical cavities on the top 1201 and sides 1202 of the cab, thus reducing drag caused by the atmosphere as the cab moves (to the left) during truck 1200 operation. Similarly, waveguide cavities 1210 may be created and placed on the top and sides of the trailer of truck 1200, and cavities 1211 may be placed on the underside of the trailer of truck 1200 as shown although flow on the truck underside is likely more perturbed because of tire rotation, and the effect of the cavities may be reduced when compared to the effects on the top and sides. The cavities can be created, for example, by affixing plastic or aluminum strips on the surfaces corresponding in shape to the waveguides; in each case, such cavities act to reduce drag caused by airflow along the trailer as truck 1200 moves to the left. It will be appreciated by one having ordinary skill in the art that various removable containers are often used in place of a complete integral trailer unit in the trucking industry today (for instance, the ubiquitous shipping containers used on container ships). According to the invention, cavities may either be permanently mounted on such containers (in which case they would also serve to reduce drag on a moving container ship, since if many containers had cavities according to the invention, a smoother boundary layer between stacks of containers and the atmosphere may be established), or may be removably mounted prior to transport. Most typically straight plastic or aluminum strips perpendicular to anticipated air flow can be affixed to truck trailers with rivets, adhesives, or other well-known means. Affixing and spacing a succession of strips that will define waveguides, should readily enable adaptation of existing tractors and trailer to the advantages of this invention. Since the size, shape and anticipated speed of groups of trailers would be expected to be largely similar, just several differently sized waveguide strips of may well be satisfactory for to modify a large cross section of commercial tractors and trailers. Finally, in some embodiments the trailing edge of truck 1200 (or of its trailer or of a mounted container), instead of being planar, comprises a half-toroidal depression, which allows vortex 1221 to form, thus reducing turbulence at the trailing edge of truck 1200 as it travels through the atmosphere. Admittedly such a construction can interfere with the rear trailer doors and would be adapted to trailers with consideration of such factors.

Once again, sizing of the waveguides may be accomplished experimentally by examining the flow past an unmodified truck for spacing and size of KH instabilities. Overall, however, it is anticipated by the inventor that installing waveguides that create vortex inducing waveguide cavities can have beneficial effects even if sizing has not been optimized. The size and spacing of the waveguides in FIG. 12 should not be considered to be to scale or to be indicative of the relative size and spacing on a typical tractor-trailer.

FIG. 13 is a diagram showing an exemplary modification of a conventional jet engine 1300 to reduce turbulence and drag and to improve fuel efficiency thereof, according to an embodiment of the invention. As is typical with jet engines in the art, gases flow from left to right through inlet 1301 of engine 1300 and exit at outlet 1320 (whereupon they expand according to profile 1331). According to the invention, drag resulting from this flow may be reduced by modifying the forward end of the cowling of engine 1300 with a plurality of vortex-inducing cavities 1302, 1303. Those cavities 1303 on the exterior surface of engine 1300 reduce drag on the engine as it moves through the atmosphere, while cavities 1302 on the interior surface of the engine 1300 reduce drag that may slow down intake air, and thus improve engine efficiency. Although the waveguides 1303 are shown only proximate to the intake of the engine, it will be understood that such waveguides might be spaced around the entire nacelle that encloses engine 1300 for purposes of reducing aerodynamic drag as will be discussed in connection with FIG. 13a.

In some jet engines known in the art as turbofan jet engines, additional air intake is allowed at an inlet point 1310 forward of exhaust cowling 1311 in order to mix exhaust gases with cooler air, in order to reduce the temperature of gases exiting at point 1320 from engine 1300. These engines can benefit from the waveguide technology of this invention by not only improving the flow characteristics of the turbofan engine but also moderating the "jet noise" created by the engine.

"Jet noise" is created as high velocity flow from the engine exchanges momentum and mixes with the ambient atmosphere and creating a "roaring" low frequency sound. There is also a combustor noise from the combustion chamber and high compression turbine. Newer high-bypass turbofan engines surround the high velocity core exhaust with lower velocity fan by-pass exhaust. That design enhancement has the effect of attenuating the jet noise from these engines. The result is that another noise source called "fan loading noise" or "buzz saw noise" has become more dominant in these modern engines.

When operating at high engine power conditions, the tip speed of the fan in a high bypass turbofan engine is supersonic. The noise spectrum from a supersonic fan is different than what is created by a subsonic fan. Supersonic fans produce a multitude of high amplitude tones at harmonics of the engine's shaft rotation frequency. These tones have come to be called the "buzz saw" noise and exit from both the front and rear of the engine. The rearward propagation "buzz saw" noise occurs through the engine and also though the bypass flow path and can be advantageously addressed by incorporating waveguide technology in both the engine exhaust and the bypass channel. Combustor noise is also attenuated by implementation of waveguide technology in the jet nozzle as will be seen in the drawings.

According to an embodiment, a plurality of vortex-inducing cavities 1312 is provided on the internal surface of exhaust cowling 1330 in order to facilitate establishment (via methods discussed above) of a smoothed boundary layer flow 1330 that acts to reduce interior drag as well as to reduce turbulence in exit gases by enabling a smoother boundary layer 1331 just aft of the engine as it passes through the atmosphere.

For clarity, FIG. 13*a* shows the cross section of a CFM56 type of turbo fan jet engine 1360. At the inlet end of the engine, a fan 1361 pressures air into both the bypass channel 1370 and into the combustion chamber 1371 itself. Centrally downstream of the fan 1361 is low-pressure compressor 1362 followed by high pressure compressor 1363. Both compressors feed the combustion chamber 1371 where fuel is burned and expanding high-pressure combustion gases are generated. These combustion gases are fed to the high-pressure turbine 1366 and low pressure turbine 1367 that provide the rotational power to the engine and expel the hot expanding gases through the nozzle 1368 to provide engine thrust.

The principal locations for placement of waveguides in the turbofan engine 1360 would be on either side 1375 and 1376 of the fairings for the bypass channel and on the interior of the exhaust gas nozzle 1377. Those regions have been signaled by heavy black line shading. Such waveguide placement can serve not only to reduce engine noise, but also to collimate the expanding gases emanating from the nozzle improving thrust. Sizing of the waveguides can be estimated by observing the KH instabilities when the engine is in operation. The heavy shading in FIG. 13*a* should not be regarded as being to scale, but are locators only for the placement of waveguides. Although the principal location for placement of waveguides in FIG. 13*a* will be at the exit surfaces as shown, they may also be advantageously placed in the bypass channel. Since FIG. 13*a* represents a generic rendering of a turbofan jet engine using the CFM56 type as an example, the placement in the bypass channel will be determined by those of skill in the art when dealing with an actual design using the principles disclosed herein. As indicated above, jet noise typically is caused by highly turbulent air that exhausts downstream of a jet nozzle. A mixing sound is created at the exit nozzle by the turbulent exhaust flow mixing with the atmosphere. Immediately downstream of the nozzle the mixing begins in an annular shear layer, and usually within four to seven diameters downstream of the nozzle, turbulence and the violent mixing takes over the entire jet exhaust stream depending upon the engine and ambient conditions. High frequency components of the noise are generated close to the nozzle where the turbulence eddies are small and spinning very fast. Further from the nozzle, the eddy sizes can grow to as large as the entire jet exhaust diameter and the lower rumbling sounds are generated. Hence, it is believed that energy absorption within the waveguides as the exhaust leaves the engine will attenuate the noise. Then the collimating effect that the boundary layer forms as a result of the waveguides can contribute to stretching the region of the most turbulent mixing and further moderates the noise.

FIG. 13*b* is a partial perspective view of the exhaust cone of a CFM56 type engine, which is constituted of five pieces that can be disassembled. At 1378, there is shown that waveguide structures have been added to one of the exhaust cone sections. Test bed testing may reveal the optimum placement pattern for waveguide structures within the engine, and hence the heavy shading in FIG. 13*a* should not be taken as an indication that waveguides must or should be placed on all shaded surfaces shown.

FIG. 14 is a diagram of a novel jet engine 1400 according to an embodiment of the invention. According to the embodiment, engine 1400 comprises a rigid exterior wall 1402 that is a solid of rotation whose cross-section is substantially an airfoil forming an aircraft nacelle. A plurality of combustion cavities 1411, similar in nature to cavities 28 in FIG. 1, is arranged on the interior surface of external wall 1402. In a focal point of cavity 1411, a fuel injection ring 1410 is placed, which is penetrated by numerous fuel outlet nozzles, holes, or injectors. Fuel injection ring 1410 may further comprise one or more igniters to ignite fuel entering cavity 1411, or separate igniters may be provided at various locations along the inner surface of cavity 1411. As fuel is injected into cavity 1411, its combustion and expansion causes a vortex to emerge within cavity 1411. Expanding combustion gases exit cavity 1411 in a substantially axial flow, thus creating a smooth boundary layer similar to those established according to previously discussed embodiments of the invention. Since expansion and acceleration of gases exiting to the right, in conjunction with the airfoil shape of external wall 1402, will pull ambient air in through inlet aperture 1401 and accelerate these gases toward exit 1440, thus accelerating engine 1400 (to the left) and any vehicle to which it is attached. Advantageously, in some embodiments cavities 1450 are provided on external surfaces of engine nacelle 1400 to reduce drag, similar to those described above with reference to FIG. 13. Various sensors 1420, 1421 may be placed at various points inside engine 1400 to assist in automatic control and measurement of engine operations. For example, sensors 1420 may be placed at a forward position within cavities 1411 in order to measure pressure, since pressure should be at a minimum when a proper vortex is established (because flow at sensor 1420 will be substantially parallel to the inner surface of cavity 1411, and will have high velocity due to low drag, and thus will induce a low pressure). Using such an arrangement, for example, fuel pressure may be adjusted into a particular cavity on a continuous basis in order to maintain pressure at sensor 1420 at a minimum, and therefore to ensure proper vortex maintenance within cavity 1411. Similarly, sensors 1421 at a point further aft in cavities 1411 could be used for monitoring pressures in order to assess engine operating conditions (and, of course, sensors 1421 could be used for the same purposes as sensors 1420).

FIG. 15 is a diagram of an assembly 1500 of generally parallel channeling gas flow tubes according to an alternative preferred embodiment of the invention. As illustrated, a plurality of flow tubes 1501 (such as for example enclosed muffler-type tubes as described previously, referring to FIG. 6) may be arranged in a parallel fashion and an assembly 1500 may further comprise a removable or fixed gas intake manifold 1510 that may be adapted in such a manner as to divide the flow of an incoming fluid 1502 and direct generally equal parts of the flowing fluid into each of the affixed tubes 1501. A partial cutaway view 1520 is illustrated for clarification purposes, and it can be seen that according to the embodiment each tube may comprise a plurality of gas flow chambers 1521 designed in such a way as to facilitate vortex-type gas flow as described previously (referring to FIG. 1). In this manner, each individual gas flow tube 1501 may be seen to represent a complete gas flow device as previously described, and such gas flow tubes may then be arranged in such a manner as to combine their effects in a parallel fashion as illustrated. It can therefore be appreciated that each tube may function as a singular or stand-alone component as needed, such as if a blockage is encountered or if a tube is removed from an assembly 1500, without causing a failure of the overall arrangement.

FIG. 16 is a diagram of an alternate assembly 1600 of channeling gas flow tubes according to an embodiment of the invention, facilitating a four-tube muffler-type device such as might be utilized in an automotive or other combustion engine. As illustrated, a plurality of gas flow tubes 1501 may be arranged in a parallel fashion as previously described (referring to FIG. 15), with an assembly 1600 further comprising a fixed or removable intake manifold 1610 designed to provide even fluid flow to each tube. Each individual tube may further comprise a plurality of air vents 1602 such as to provide passive or active cooling during operation, as well as to further improve noise attenuation during operation (such as by permitting an insulating air chamber surrounding the internal components of the gas flow tubes). According to the embodiment, an assembly 1600 may be designed such as to occupy a similar spatial volume as a traditional muffler device or assembly (or specific dimensional requirements, such as overall length or diameter), while providing improved function through the use of parallel-operating gas flow tubes 1610 as illustrated. Such as design reduces the internal volume of the muffler overall, but by utilizing vortex gas flow chambers according to the invention the gas flow may be optimized in terms of velocity as well as flow per unit of time, thereby accommodating the fluid behavior that may be generally expected from a combustion engine (such as variable or pulsating gas flow). Additionally, the design may be such that noise is dramatically reduced, as may be particularly desirable in a muffler or similar device, by reducing the impact of gas flow variations or perturbations through the toroidal flow within the gas flow tubes (as previously described). Thus it can be appreciated that a parallel assembly of gas flow tubes may have numerous desirable effects to improve function over simpler or more traditional designs utilizing large, singular volumetric expansion chambers, as are common in the art.

The parallel waveguide tube configurations discussed in connection with FIGS. 15, 15*a* and 16 offer an advantage of enabling "repackaging" a waveguide muffler structure to accommodate available space. In a large engine demanding waveguide cavities of substantial size the longitudinal dimension that might be needed to accommodate the muffler, the exhaust may be alternatively fed to a manifold that distributes the exhaust into multiple waveguide structures such as shown in the aforesaid figures.

FIGS. 17*a*, 17*b* and 17*c* illustrate flow chamber conformations with inlets and outlets supporting a left-to-right flow could be accomplished solely from pressure forming of tubular goods as will be appreciated by those of skill in the art. In both FIG. 17*a* and FIG. 17*c* the inlet has a greater or lesser venturi effect, and the outlet is smaller than the inlet. By comparing the waves 1715 of FIGS. 17*a* and 1745 of FIG. 17*c* respectively, a person of manufacturing skill will appreciate how the depth and amount of wall curvature that exists in the guide cavities can be altered by simply altering the outer shape of a repeating waveguide stage such as 1716, and modifying the final guide stage composed of parts 1717 and 1718. The arrangement in FIG. 17*c* has differently sized stages that can be formed by changing the length of the tubular goods that are formed thereby producing the conformation of successive stages like 1746 through 1751. It will be understood that varying the amount of curvature in the regions of each stage represented at 1752 and 1753 enables forming waveguide cavities of increasing curvature.

FIG. 17*b* illustrates how the waveguides in device 1730 can be formed in a fully generally toroidal shape with varying depth by forming planar "donut" of varying annular dimension. Whereas the initial waveguide cavity 1731 (which also functions as a venturi near the inlet) may be formable from tubular goods, the remaining cavities have posterior portions (i.e., in the inlet direction) that might be difficult to form from a single piece. Hence pieces 1732, 1733, and 1734 can be created by indenting donut shaped planar material of differing and increasing annular dimension into parts of waveguide cavities of different depth. The anterior mating members 1735, 1736, and 1737 may be formed from tubular goods of different lengths and joined with 1732, 1733 and 1744 to form the completed waveguide cavities. Accordingly, it will be understood that a wide variety of waveguide cavity shapes can be created with totally curved and partially curved configuration by mass manufacturing techniques enabling tuning of mufflers to obtain different sounds and resonances.

FIGS. 17*d*-*f* illustrate schematically with left-to-right flow some of the design considerations that might be implemented to produce a multi-cavity waveguide structure for a decelerating gas. Diagram 1760 in FIG. 17*d* shows a schematic four-cavity structure where inlet and outlet ports are equal and the cavities are slightly elliptical in shape 1761 but still approximate a half-toroidal curve as shown at 1763, The anterior portion of each waveguide cavity opens widely to the central channel. It can be seen that the openings of the cavities are nearly as large as an entire stage 1765 of the waveguide cavity. FIG. 17*e* shows another elliptical cavity design where opening is more restricted with lip 1776 closing the anterior portion of the opening of the wave cavity. The design intent of having the structure more actively contain all the vortices created in the waveguide cavities and so the opening of the cavities to central flow is smaller than the length of a stage 1778. Note also that lip 1776 is further from the flow centerline that the posterior edge of the cavity 1780 where the in-cavity vortex would be expected to shed, thus opening the cavity to spill the vortex in a way not attempted in FIG. 17*d*. In FIG. 17*f*, another elliptical waveguide cavity structure, the sharp lip 1776 is replaced by a rounded nose 1791 that can aerodynamically accelerate gases to flow down the boundary layer or alternatively enter the waveguide cavity while the size of the stage 1792 remains roughly the same. In FIGS. 17*d* and 17*f* the lip 1776 and the rounded nose 1791 represent a different manner of designing an inflection point into a wave cavity structure.

The decreasing ratio between inlet and outlet size when moving sequentially from FIG. 17*d* to FIG. 17*f* will cause acceleration of the flowing gas. This acceleration must be moderated so that a rearward compression wave is not generated. Placing obstacles to flow of the boundary layer or creating rearward compression waves can disrupt the operation of the waveguide unit. But elongating the outlet of the muffler chamber is a design tactic that can has been shown to assist in suppressing high frequency whistle sounds in mufflers. When an engine is running at high RPM and exhaust is maximized, small rapidly rotating vortices may be formed that contribute to a high frequency whistling sound. A gradual lengthening of the last stage of the unit coupled with some narrowing of the flow can have the effect of ameliorating the high frequencies.

FIG. 18*a* illustrates how a low drag waveguide surface 1801 might be constructed from sheet material, and FIG. 18*b* shows how a rectangular channel or duct can be created by opposing two surfaces 1801 and 1802 with waveguide configurations to accelerate gas travel through a duct while eliminating noise. The proximity of the sheets in FIG. 18*b* should not be taken as indicative of any particular construction. As before, in configuring a rectangular or duct-like passage, there will typically be an outlet no larger than the inlet, with perhaps the introduction of a venturi effect when conducting the flow through the inlet. Spacing and size of the waveguide cavities can be estimated by examining the KH instabilities that form when the flow is examined without the waveguide structure in place.

The waveguide surface in FIG. 18a may be constructed of metal by joining curved pieces 1805 comprising the posterior portion (that is, the inlet side) of each waveguide cavity with pieces 1806 forming the anterior portion of the cavities. A surface of this nature might also be conveniently created from a thermoformed plastic material if heat resistance is not a factor.

For example, race cars and hydroplanes frequently have "spoilers" or aft mounted wings that seek to hold the vehicle down on the road or the water. A racecar 1820 is shown schematically at FIG. 18c that has an airfoil shaped spoiler 1821 suspended generally over the rear wheels by two tubes 1822 and 1824 that in this embodiment represent dual exhausts. Opposing waveguide surfaces such as shown in FIG. 18b are shown at 1826 and 1828 encased in a suitable housing shaped in the form of the airfoil. An entry manifold could then readily receive the exhaust from the vehicle engine and distribute the exhaust along the length of the spoiler at its leading edge 1830, with the exit for the gases being at the spoiler's trailing edge 1832. In FIG. 18c an embodiment is illustrated that shows the port side of spoiler 1821, the dual exhausts are conducted directly into the waveguide structures and the first waveguides cavities shown at 1840 and 1842 in FIG. 18e function as a manifold and distribute vortices along their length. In such a case, the flattened rectangular waveguide tube within the spoiler would function to muffle the exhaust, and more importantly in the context of the racing application, would reduce back pressure that the exhaust system would impose upon the engine. The exhaust stream exiting the trailing edge of the spoiler 1832 will improve the aerodynamic performance of the spoiler. Individuals of skill in the art will readily appreciate how such construction might be accomplished using the opposing waveguide surfaces of FIG. 18b.

As with other applications the strength of the compression wave will determine the number of waveguide cavities to incorporate in the spoiler, and the volume of the exhaust will determine the size of the entry, exit and unobstructed passage through the waveguide. If those requirements can accommodate, it may be sufficient to create a waveguide tube within the spoiler using a single waveguide surface such as that shown in FIG. 18a. In FIG. 18d, which also shows the spoiler in a sectioned port side view, there is illustrated an airfoil with a single waveguide surface 1840. The waveguide surface is opposed in this embodiment by a smooth surface 1842. Such design modification is well within the skill of technicians dealing with racing vehicles of the type mentioned.

FIGS. 19a and 19b are included in explanation and verification of the discussion of flow patterns in the waveguide structures of this invention. When using the waveguide structures, vortices are encouraged to form that possess a flow vector in the direction of the unobstructed flow down the central channel of the waveguide structure. FIG. 19a shows a photograph taken after the conclusion of an experiment where a gas infused with baking soda powder was propelled left to right though a narrow passage. Plywood waveguides 1901 were pattern-cut to form waveguide cavities defined two side boundaries with a flat under surface and an upper clear planar window completing the channel. The upper clear window was removed for the photograph. FIG. 19a shows that soda remnants 1902 collect on the anterior (i.e., the outlet side) surfaces of the right three waveguides. In addition, there appear faint soda depositions 1904 defining the position of the boundary layer of gas formed by the shedding vortices. Note also that the soda deposition after the gas exit shows an under-expanded thrust boundary layer 1906. Outside the boundary layer the flow is not tumbling in turbulence as indicated by the clear line of baking soda remnants 1906. The waveguide device serves to confine the exit stream substantially when compared to the same flow exiting a standard bell venturi configuration without waveguide structures. FIG. 19b is an illustration created in assistance of interpretation of FIG. 19a. The vortices such as 1910 peel off the posterior surfaces of the waveguides and provide a tractoring impetus at 1912 to the boundary layer 1914. The vortices on the upper waveguides travelled in a counterclockwise direction while that of the lower waveguides moved clockwise (in this planar view). This experiment supports the observation that the vortices in a waveguide structure shed from the posterior surface of the waveguide cavities and produce a boundary layer beyond the edges of the waveguides. Moreover, the exit soda remnants shown at 1906 in FIG. 19a and interpreted using the same number in FIG. 19b verify that the waveguide structure creates a more collimated or confined exit stream which is ascribed to boundary layer effect.

Computational fluid dynamic ("CFD") studies on waveguide structures of this invention provide insight into the fluid dynamics of a waveguide device. FIGS. 20a, 20b and 20c represent images obtained using CFD on a curved waveguide muffler and motorcycle muffler having the straight line waveguide structure of FIGS. 6a and 6b. Dynamometer tests performed on the motorcycle gave the basis for measuring the mass flow rate of the motorcycle exhaust stream. That mass flow rate was then used in the CFD analysis. The CFD sought to produce images of the flow patterns within each device. FIG. 20a is a graph 2050 that records the axial pressure above ambient (on the y-axis) as a function of the position of the measurement along the x-axis measured in inches. The CFD results indicate the pressure at the axis of the device was reduced by about 0.4 psi, and indicating that backpressure build-up did not occur. The lower portion FIG. 20a at 2060 is the CFD depiction of vortex formation within guide cavities with streamlines that are intended to show the translational velocity of gas though the muffler. CFD data did not distinguish between the upper and lower halves of the symmetrical structure, so the image above the axis is the reverse of that below. Original CFD results were reported using colors to represent different velocities. The black and white version of FIG. 20a suitable for printing was created by the inventor in an attempt to represent those results. Direct labels indicating the inlet-to-outlet velocity (translational speed down the device) in meters per second were placed directly on the axis of the conduit in FIG. 20a. That axial velocity varies from about 15 m/sec. to about 100 m/sec at the outlet. The vortices, however, have low translational velocity since they are captured within the waveguide cavities. The translational speed within the vortices in meters/second is also recorded directly on the figure at 2060. Those velocities vary from zero to moderate speed as the flow moves from inlet to outlet. The major or largest vortices are located in a posterior position in each waveguide cavity. The speeds in the regions of secondary vortices are somewhat and those results may be recording the translational movement of the boundary layer that passes just beyond the edges of the waveguides. The major vortices tend to appear slightly elliptical because of the elongated shape of the waveguide cavities with the horizontal (or longer) axis of the ellipse being in the direction of flow and the vertical (or shorter angle) of the ellipse being somewhat transverse to the direction of flow in the central channel. It is postulated by the inventor that if the wave cavities were precisely the correct size for the velocity, temperature, and viscosity of the flowing fluid and were provided with lip protection as shown if FIGS. 17*e* and 17*f*, the major vortex would tend to occupy virtually the entire cavity. But since the flow rates are variable and pulsations caused by the firing of engine cylinders depend upon engine rpm precise sizing for all conditions would be difficult to achieve. It will be typical that secondary vortices and even tertiary vortices will be created.

It is an objective of the design to promote the formation of one major vortex or "working vortex" in each of the waveguide cavities that will be in direct communication with the boundary layer. That working vortex will typically reside in the posterior portion of the waveguide cavity and be in a position to shed its flow and energy into the boundary layer through the waveguide cavity opening. The cavity opening must be large enough to permit vortex to shed both flow and energy, and generally have a cross-sectional profile of at least 90° of the largest working vortex. Smaller vortices may be propelled by the major vortex to spin in the opposite direction (as would adjacent gears being driven by a larger gear) and to spin faster. In sizing and spacing waveguide cavities, attention should be given to containing these "counter-spinning" vortices within the waveguide cavities using design strategies outlined above. Counter-rotating vortices do not prevent the establishment of the boundary layer that is proceeding past the edges of the waveguides as will be more graphically evidenced by the images in FIG. 20*b*. Still the creation of spinning vortices is seen to provide multiple "spring like" domains within the waveguide cavities that can absorb and shock forces generated by pressure perturbations or unwanted noise.

FIG. 20*b* is a CFD image 2070 depicting velocity domains, and shows that translational velocity in the center of the conduit is consistent with what was observed in FIG. 20*a*. FIG. 20*b* also indicates that the overall vortices have little translational velocity in the inlet-to-outlet direction. The velocity at the centers of the major vortices stays around zero. Interestingly, counter-rotating vortices have domains with translational velocities of 10, 12, 13, and 14 meters/second in the inlet-to-outlet direction. The boundary layer can also be seen forming with domains at the second through fourth lobe moving more slowly than the gas moving down the axis of the conduit. It is not clear if the counter-rotating secondary vortices are shedding energy to the boundary layer, but despite the counter-rotation the boundary layer persists. The CFD images in FIGS. 20*a* and 20*b* were created under a simulation of a pressure pulse of about 2 milliseconds on the inlet. The pattern of the vortices appear less disturbed as the gas moves through the device suggesting that increasing the number of waveguide cavities should increase the creation of effective vortices and should attenuate the sounds of an engine.

FIG. 20*c* shows a schematic profile used to subject the motorcycle muffler of FIGS. 6*a* and 6*b* to CFD analysis. As explained above, the waveguides in this device were straight frusto-conical pieces placed sequentially in a muffler body as shown schematically at 2080. The edges of the frusto-conical pieces define an unobstructed path from inlet to outlet. In the upper image 2080, there are no curved surfaces in the waveguide cavities to encourage vortices to form. In the lower image 2090, the CFD generated image (originally in color and interpreted in black and white) shows the vortices to be highly fragmented. Consequently, the structure of FIGS. 6*a* and 6*b* departs from the typical muffler design that inserts obstructions in the path form inlet to outlet, and has a structure that encourages the creation of vortices protected by waveguides from the incoming flow which can serve as energy absorbing domains. It is believed that the vortices act like springs to absorb energy including engine pulsations and noise.

CFD was also employed to examine flow though the frusto-conical muffler of FIGS. 6*a* and 6*b*. FIG. 20*c* shows a depiction 2090 of that data translated to grayscale without an effort at interpretation of the original color image because the colors were not as variable as with the color images from which FIGS. 20*a* and 20*b* were interpreted. The only conclusion that could be drawn was that the translational velocity of the vortices in the waveguide cavities 2092, 2094, 2096, and 2098 was somewhere between zero and 5 to 8 meters/second and translational velocity at the outlet was perhaps in excess of 80 meters/second. However, there are a multitude of vortices to function as energy absorbers.

A more significant comparison of muffler structures is shown in FIGS. 20*d* and 20*e* which shows the acoustic transmission loss as a result of a static point-source acoustic simulation analysis. The simulated sound was the exhaust of the Suzuki Hyabusa motorcycle at 3500 rpm. The test conditions simulated the effects of three mufflers graphically represented in FIG. 20*d* at 2030. Model a is a simulation of the muffler of FIGS. 6*a* and 6*b*; model b was a basic single expansion chamber; model c was a four-lobe curvilinear waveguide tube in accord with this invention having a cross-section as shown in 2030 also conforming generally to that cross-section shown in FIGS. 20*a* and 20*b*. The computerized test conditions simulated the three models with no fluid movement. In other words, a sound source projected the Suzuki's exhaust sound into the three models in a computer simulation. The difference between the amplitude in decibels of the sound at the source and the outlet was determined to be "acoustic transmission loss." The inlet and outlet length and diameter on all models was the same and the length and diameter of the waveguide chambers were the same which meant that the volume of model c was less than that of the model b, the single resonant chamber. At 2040, FIG. 20*e* shows the transmission loss for the three models and records a transmission loss of as much as 90 decibels in the model c configuration, A further simulation (not shown) undertaken with a two-lobe configuration corresponding to model c with lobes 2033 and 2036 removed still showed better transmission loss than the single expansion chamber.

In principle, the waveguide structures of this invention should be designed so as to avoid the generation of any return pressure waves moving toward the inlet side of the device, The FIG. 19 series shows that the vortices created in the waveguide cavities "peel off" or shed to form a boundary layer from the posterior curved surface of the waveguide cavity. Any flow-impeding structure that disrupts this boundary layer should be avoided. Hence the waveguide edges are inclined in the direction of flow, and pressure pulses must be managed within the device by providing sufficient volume to absorb and dissipate the pressure pulses and avoid creation of backpressure effects that would disrupt flow from inlet to outlet.

A principal function of a muffler on an internal combustion engine is to suppress the acoustic pulse generated by the combustion process. A pressure wave generated by combustion in the engine cylinders is transmitted through the exhaust pipe and radiates from its end to the atmosphere. That pressure wave repeats at the firing frequency of the engine which can be calculated for a four stroke engine as Frequency (pulses/sec.)=engine rpm×½ number of cylinders÷60

Moreover, these pulses will vary in strength depending, for example, on the size of the engine. Typically, in configuring mufflers in accord with this invention, stronger compression waves require a muffler with more waveguide stages. Each stage serves to decompress the pressure wave's potential to expand (hence the illustration of the multi-stage silencer-suppressor which must moderate a strong explosive pressure wave.) The diameter of the inlet, outlet and expansion chamber within the muffler should increase as the volume of the exhaust gases increase. Once again the spacing of the waveguide cavities can be empirically estimated by examining the KH-wave pattern of the exhaust jet without the muffler as discussed above.

The initial exhaust prototype for motorcycles discussed above and illustrated in FIG. 6a with a straight guide profile demonstrated performance increases as described above when tested on a Suzuki motorcycle. On another motorcycle, curvilinear guide surfaces having a cross-section generally similar to that shown in FIG. 17a produced a mellower and more pleasing sound, better attenuation, and improved engine performance. The inventor suspects that an effect analogous to that which is used advantageously in musical instruments occurs (specifically, trombones, trumpets, tubas, and other horns comprise curved geometries in their design. If more sound is consumed (attenuated) by an exhaust system according to the invention, it indicates that more compression waves have been employed as a motive force to accelerate gas, therefore better quieting may be used according to the invention as an indicator of better exhaust performance, and in some embodiments manual adjustments of tube 10 geometry (for instance, by changing spacing between guides) may be provided to allow users to "tune" their exhaust system for optimal sound and energetic performance.

Because it is well-known that toroidal vortices may become highly charged, such that their organizing structure becomes more resistance to decay, the application of a static or resonant electric field to cavities within various embodiments of the invention provides a novel control means for manipulation of fluid moving through various embodiments. For example, in the inventor's experiments it was noted that the presence of a resonant electric field applied to a tuned, metallic transducer in the vicinity of a cavity 28 imposed a field that caused evaporation of dew forming on an adjacent metal surface, without any other changing condition commonly associated with evaporation, such as increased heat or lowering of atmospheric relative humidity. The coupling of various embodiments with electric field controls may be used to control a variety of physical effects, especially by way of phase change when water vapor is present in a flow, in which the embodiment may be utilized as a novel evaporative system to absorb heat. Conversely, it has been observed that, when used with internal combustion engine exhaust, water vapor condenses into visible form from the outlet, when the guide design is slightly changed. Accordingly, in various embodiments of the invention, an output of a signal generator is connected to a high-voltage step-up coil or a voltage multiplier, the output voltage of which is connected to one or more guides 30, each guide 30 being electrically isolated from the others and from an exterior body 604 of the embodiment by an electrical insulator. Each stage receives a signal that imposes control and stimulates intensification of vortex 28 within cavity 30.

FIGS. 21 a-f relate to the application of the principles of this invention to wind turbine blades that are now commonly regarded as providing a sustainable source of electric energy. FIG. 21a shows a three bladed wind turbine 2100 mounted on an elevated stanchion 2102 that positions the rotational center of the turbine usually between about 150 to 250 feet in the air and is adapted to turn to face the actual wind. Typically the higher the turbine can be positioned, the more wind velocity is encountered thereby improving power generation efficiency. FIGS. 21b and c are closer views of the entire device and of blade detail. The blades 2104 of the wind turbine in modern usage range in length from about 50 to about 120 feet. The blade cross section generally conforms to the shape of a cambered airfoil as generally shown in FIG. 21d. Unlike an airplane wing, however, the wind turbine airfoil is twisted significantly (as is an airplane propeller) because the apparent wind (determined by a vector resolution of the true wind and the rotational speed of the blade and measured on a chord extending from the hub of the turbine to the blade tip) is significantly higher at the tip than is the apparent wind on the blade close to the rotational axis of the turbine. Wind turbines are normally rotating at speeds of 10 to 20 revolutions per minute, so a formula to estimate the approximate speed of the blade in miles per hour at any position would be:

Blade Speed (mph)=14×Feet from Center of Rotation/20×RPM/10

Calculating the speed of a 120 foot blade at 20 rpm, the blade tip of a wind turbine can exceed 160 miles per hour whereas close to the center of rotation the velocity of the blade approaches zero.

The difference in apparent wind experienced over the length of the blade means that the pitch of the blade to apparent wind must decrease as the distance from the root of the blade increases. Therefore, the lowest angle of incidence is at the blade tip. FIG. 21d shows the effect on the lift component experienced by the blade from a first position where the angle of incidence to apparent wind (i.e., pitch) is about 3° resulting in a small lift component 2140 that is nonetheless greater than drag 2142 is exerted on the wing. A second position in FIG. 21d shows the incident angle of 10° creating a substantial lift component 2144 and a small drag component 2146. The third position shows the incidence angle at is 30° and the airfoil is essentially stalled with the lift 2148 being overcome by the drag 2150.

FIG. 21c shows arrays of waveguides 2106 arranged perpendicularly to the apparent wind commencing a distance from the hub of the turbine 2108 in accordance with likely efficient positioning being at a point where the apparent wind velocity is at a satisfactory level. (The drawings in this embodiment should not be regarded as being to scale.) At a portion of the blade more distant from the hub there is a continuous array of waveguides extending to near the tip, which is preferably rounded to eliminate tip losses. FIG. 21c shows schematically that the array of waveguides extends to a region near the tip of the blade. The provision of long waveguides creates the opportunity for the high speed vortices created near the tip to propagate their velocity inwardly through the longitudinal waveguide thereby creating the boundary layer heretofore discussed that contributes to organized laminar flow over the blade.

At 2107 in FIG. 21b there is shown a raked wingtip, which is an alternative construction to eliminate losses from wing tip vortices. If such a construction is adopted the waveguides should be arranged on the raked portion of the wing tip to maintain the waveguides as generally perpendicular to the apparent wind as shown 2109. The drawings are not intended to represent the number of waveguide arrays and or their precise placement.

The size and placement of waveguides along the length of wind turbine blades will vary and the waveguide cavities would be expected to be deeper at points where the blade's airfoil is thicker and the apparent wind velocity slower, and the cavities shallower proceeding toward the tip where higher apparent wind velocity is expected. The spacing between waveguide cavities will remain the same if the same gases are involved. Air is the fluid in all cases, but temperature and humidity can have a small effect on spacing. Estimates based on the perceived KH instabilities created by a non-wave-guided surface (whether established empirically by laboratory wind tests or by CFD) when under the most frequently encountered wind conditions. Of course, in use the wind turbine will experience varied conditions, but as indicated in connection with earlier waveguide applications flow benefits occur even when the waveguide cavities are not ideal for the flow conditions being experienced, and hence scientific judgment to size the waveguides properly under the predominant conditions and/or application specific conditions should be exercised.

Generally, placement of the waveguides is made preferably on the underside (non-cambered or lower cambered) surface to create a low drag or reduced drag surface. Placement of the waveguides is also preferably made at locations on the blade's airfoil expected to experience relatively high or moderately high apparent wind, and therefore having a low or moderate angle of incidence to the apparent wind. The underside surface without waveguide addition is shown at 2108 in FIG. 27d. The fluid dynamics in regions of low anticipated apparent wind near the center of rotation will be less likely to benefit from waveguides. In blade regions nearer the blade tip, where the angle of incidence is low and apparent wind is higher, waveguide placement can reduce drag on both the cambered and non-cambered surfaces. Hence it will be more beneficial to introduce waveguides on the forward areas of the cambered surface (not illustrated but reference the airfoil at FIG. 10) as well as on the non-cambered surface of the blade airfoil. The placement of waveguides on both surfaces of a wind turbine airfoil is not shown, but will be understood from the foregoing discussion and the present disclosure.

The waveguide structures have the additional benefit of moderating "buffeting" forces that result from gusting winds and wind turbulence. The waveguides provide a surface, which will assist in reducing the vibrational effect of buffeting that reduces the aerodynamic efficiency of the blades, and perhaps more importantly translates to the bearing and causes damage that is expensive to repair.

FIG. 27f shows a wind turbine blade cross-section maximally configured with multiple waveguides 2109 which should produce a smooth and adhering flow to the underside of airfoil 2110. In many instances fewer waveguides may be effective particularly if positioned more preferably at and near the leading edge of the airfoil. It also should be noted that since effective waveguide improvements on wind turbine blade performance are realized at locations experiencing relatively higher apparent wind.

Although waveguide placement is shown in the drawings as being integrated into the wing structure during manufacture, it should be understood that adhering a layer of material incorporating the waveguides to appropriate surfaces of the blades of a wind turbine will be equally satisfactory. For example, a light weight plastic sheet or a series of interfitting elements formed with waveguides may be adhered to the wind turbine blades particularly in regions of high apparent wind where the waveguide cavities would be expected to be smaller than in regions of low apparent wind. Installation of waveguides using such a sheet or series of elements has economic advantages realizable by retrofitting existing blades as well as offering an economic alternative to revising wing turbine blade manufacture.

FIG. 27e shows a variation of the waveguide structure suggested for regions where the blade's airfoil is at a high angle of incidence to the apparent wind and stalling of the wing or airfoil is threatened. A double waveguide cavity configuration 2113 has a first waveguide cavity 2115 accepting the flow of apparent wind on the underside 2117 of the blade's airfoil and a second smaller counter-rotating cavity at 2119. As shown earlier, the flow of apparent wind along the underside of the blade will induce a vortex 2121 in cavity 2115 shown spinning in a counterclockwise direction. A small lip protrusion or nose 2127 of the type discussed in connection with FIGS. 17e and f seeks to confine and prevent the occurrence of secondary vortices in cavity 2115. First cavity 2115 communicates with smaller cavity 2119 in which a counter-rotating clockwise vortex 2123 is induced o spin. The smaller cavity is also supplied with a vent 2125 communicating with the upper cambered surface of the blade 2129. The vent is configured to accept gas shed from vortex 2121 and propel those gases to the cambered surface. The Coanda Effect will result in the vented gas adhering to the cambered surface and smoothing out the disrupted flow that tends to occur at high angles of incidence hence resisting the tendency of the blade to stall.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The skilled person will be aware of a range of possible modifications of the various embodiments described above. Accordingly, the present invention is defined by the claims and their equivalents.

What is claimed is:

1. A tube for assisting gas flow between an inlet end opening where gas is introduced and an outlet end opening through which gas exits the tube and for suppressing noise accompanying the gas movement which comprises:
   a closed chamber intermediate between the opening and exhaust ends for receiving the gas from the inlet, which closed chamber has an overall volume which permits expansion of the entry gas;
   wherein the closed chamber presents to the gas flow a series of waveguides arranged successively in an axial direction and inclined inwardly from interior walls of the closed chamber generally in the direction of flow that leave an unobstructed path for gas flow from the inlet end to the outlet end;
   the waveguides defining a plurality of annular guide cavities between successive inwardly extending edges of the waveguides and the outer wall of the chamber each annular guide cavity having at least a volume upstream of the guide edge and a cavity mouth open to the unobstructed path;

the waveguides being sized and spaced such that gas vortices are created within the annular guide cavities when gas flow occurs, which vortices create a fluid boundary layer that moves past the guide edges and cavity mouths more slowly in the direction of flow than the unobstructed fluid flow more remote from the cavity mouths;

wherein each waveguide comprises an inner wall with concave curvature on a gas inlet end and convex curvature on a gas outlet end and has an inflection point of curvature axially downstream of the inlet of the respective waveguide; and wherein an effective radius of the boundary layer is either constant or decreases with distance from the inlet end.

2. The tube in accordance with claim 1 wherein the upstream volumes of the annular guide cavities have a partially curved boundary wall that encourages the development of gas vortices within the annular guide cavities.

3. The tube of claim 2 wherein the upstream volumes of the annular guide cavities approximate a half toroid.

4. The tube of claim 3 wherein the tube is a muffler arranged to accept the exhaust stream from an engine and has a series of similarly sized annular guide cavities the size and spacing of which approximate the size and spacing of Kelvin-Helmholtz instabilities an unmuffled exhaust stream produces when exiting to atmosphere.

5. The muffler of claim 4 wherein there are four to ten similarly sized annular guide cavities.

6. The tube of claim 3 wherein the tube is a silencer/suppressor arranged to be affixed to the barrel of a firearm and has a series of similarly sized annular guide cavities.

7. A noise suppression system for a turbofan jet engine which is effected by placement of annular waveguide structures on opposing annular tubular surfaces of the bypass channel and upon opposing surfaces of the jet nozzle exiting the combustor region of the engine said annular waveguide structures comprising:

a plurality of waveguides each guide creating a guide cavity in the surface arranged perpendicularly to the flow, the guide cavities being volumes that are each defined by a guide edge extending generally in the direction of flow and forming a portion of an enclosed volume of the cavity that extends behind and upstream of the guide edge has a shape that approximates a half toroid and a cavity mouth that opens the cavity volume downstream of the guide edge in the direction of flow into the region where the unidirectional flow and path of fluid past the surface is relatively unobstructed;

the waveguides being sized and spaced such that fluid vortices are created within the cavities when fluid flow occurs, which vortices create a fluid boundary layer that moves past the guide edges and cavity mouths more slowly in the direction of flow than the unobstructed fluid flow more remote from the cavity mouths;

wherein each waveguide comprises an inner wall with concave curvature on a gas inlet end and convex curvature on a gas outlet end and has an inflection point of curvature axially downstream of the inlet of the respective waveguide; and wherein an effective radius of the boundary layer is either constant or decreases with distance from the inlet end.

8. The turbofan jet engine of claim 7 where the size and spacing of the waveguide cavities approximates the size and spacing of Kelvin-Helmholtz instabilities created by flow through the bypass channel and the jet nozzle prior to introduction of the waveguide structures.

9. A surface that enhances the flow of a fluid unidirectionally over the surface that comprises:

a plurality of waveguides each guide creating a guide cavity in the surface arranged perpendicularly to the flow, the guide cavities being volumes that are each defined by a guide edge extending generally in the direction of flow and forming a portion of an enclosed volume of the cavity that extends behind and upstream of the guide edge and a cavity mouth that opens the cavity volume downstream of the guide edge in the direction of flow into the region where the unidirectional flow and path of fluid past the surface is relatively unobstructed;

the waveguides being sized and spaced such that fluid vortices are created within the cavities when fluid flow occurs, which vortices create a fluid boundary layer that moves past the guide edges and cavity mouths more slowly in the direction of flow than the unobstructed fluid flow more remote from the cavity mouths;

wherein each waveguide comprises an inner wall with concave curvature on a gas inlet end and convex curvature on a gas outlet end and has an inflection point of curvature axially downstream of the inlet of the respective waveguide; and wherein an effective radius of the boundary layer is either constant or decreases with distance from the inlet end.

* * * * *